United States Patent
Walker et al.

(10) Patent No.: US 10,545,748 B2
(45) Date of Patent: *Jan. 28, 2020

(54) WRAPPING UNMANAGED APPLICATIONS ON A MOBILE DEVICE

(71) Applicant: Citrix Systems, Inc., Fort Lauderdale, FL (US)

(72) Inventors: James Walker, Deerfield Beach, FL (US); Zhongmin Lang, Parkland, FL (US); Gary Barton, Boca Raton, FL (US); Vipin Aravindakshan, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/957,642

(22) Filed: Apr. 19, 2018

(65) Prior Publication Data

US 2018/0239599 A1 Aug. 23, 2018

Related U.S. Application Data

(63) Continuation of application No. 14/752,132, filed on Jun. 26, 2015, now Pat. No. 9,971,585, which is a
(Continued)

(51) Int. Cl.
*G06F 9/445* (2018.01)
*G06F 8/61* (2018.01)
(Continued)

(52) U.S. Cl.
CPC ............ *G06F 8/61* (2013.01); *G06F 3/04842* (2013.01); *G06F 8/30* (2013.01); *G06F 8/316* (2013.01);
(Continued)

(58) Field of Classification Search
CPC ................................................ G06F 8/30–78
(Continued)

(56) References Cited

U.S. PATENT DOCUMENTS 5,369,702 A 11/1994 Shanton
5,805,803 A 9/1998 Birrell et al.
(Continued)

FOREIGN PATENT DOCUMENTS

CN 1313690 A 9/2001
CN 1613040 A 5/2005
(Continued)

OTHER PUBLICATIONS

Mar. 30, 2018—U.S. Final Office Aciton—U.S. Appl. No. 14/055,038.
(Continued)

*Primary Examiner* — Chuck O Kendall
(74) *Attorney, Agent, or Firm* — Banner & Witcoff, Ltd.

(57) ABSTRACT

Methods and systems are disclosed for providing approaches to generating managed applications from unmanaged applications on a mobile device. The methods and systems may include storing, by a mobile device in a memory of the mobile device, one or more unmanaged applications each comprising a corresponding application bundle and decoding, by the mobile device, the retrieved application bundle corresponding to the first unmanaged application. The methods and systems may also include modifying, by the mobile device, the decoded application bundle corresponding to the first unmanaged application by adding a set of one or more policy-based control instructions, compiling, by the mobile device, the modified application bundle to generate a first managed application, the first managed application being configured to operate in accordance with the set of one or more policy-based control instructions, and providing, by the mobile device, the first managed application.

20 Claims, 8 Drawing Sheets

Related U.S. Application Data continuation-in-part of application No. 14/055,038, filed on Oct. 16, 2013, and a continuation-in-part of application No. 14/055,078, filed on Oct. 16, 2013, now Pat. No. 9,170,800.

(60) Provisional application No. 61/825,384, filed on May 20, 2013, provisional application No. 61/714,469, filed on Oct. 16, 2012, provisional application No. 61/825,384, filed on May 20, 2013, provisional application No. 61/714,469, filed on Oct. 16, 2012.

(51) Int. Cl.
| | | |
|---|---|---|
| *G06F 8/52* | (2018.01) | |
| *G06F 8/72* | (2018.01) | |
| *G06F 8/76* | (2018.01) | |
| *G06F 21/33* | (2013.01) | |
| *G06F 21/53* | (2013.01) | |
| *G06F 21/57* | (2013.01) | |
| *G06F 8/30* | (2018.01) | |
| *G06F 8/34* | (2018.01) | |
| *G06F 3/0484* | (2013.01) | |
| *G06F 8/41* | (2018.01) | |
| *G06F 8/71* | (2018.01) | |
| *H04W 24/02* | (2009.01) | |

(52) U.S. Cl.
CPC ............ *G06F 8/34* (2013.01); *G06F 8/41* (2013.01); *G06F 8/52* (2013.01); *G06F 8/62* (2013.01); *G06F 8/71* (2013.01); *G06F 8/72* (2013.01); *G06F 8/76* (2013.01); *G06F 21/33* (2013.01); *G06F 21/53* (2013.01); *G06F 21/57* (2013.01); *H04W 24/02* (2013.01)

(58) Field of Classification Search
USPC .................................................. 717/140, 175
See application file for complete search history.

(56) References Cited

U.S. PATENT DOCUMENTS

| | | | |
|---|---|---|---|
| 6,151,606 | A | 11/2000 | Mendez |
| 6,154,172 | A | 11/2000 | Piccionelli et al. |
| 6,314,409 | B2 | 11/2001 | Schneck et al. |
| 6,480,096 | B1 | 11/2002 | Gutman et al. |
| 6,609,198 | B1 | 8/2003 | Wood et al. |
| 6,621,766 | B2 | 9/2003 | Brewer et al. |
| 6,751,738 | B2 | 6/2004 | Wesinger, Jr. et al. |
| 6,859,879 | B2 | 2/2005 | Henn et al. |
| 6,883,098 | B1 | 4/2005 | Roman et al. |
| 6,901,588 | B1 | 5/2005 | Krapf et al. |
| 6,987,906 | B2 | 1/2006 | Nakama et al. |
| 7,043,453 | B2 | 5/2006 | Stefik et al. |
| 7,065,652 | B1 | 6/2006 | Xu et al. |
| 7,103,915 | B2 | 9/2006 | Redlich et al. |
| 7,110,629 | B2 | 9/2006 | Bjorkman et al. |
| 7,159,120 | B2 | 1/2007 | Muratov et al. |
| 7,240,015 | B1 | 7/2007 | Karmouch et al. |
| 7,254,831 | B2 | 8/2007 | Saunders et al. |
| 7,263,256 | B2 | 8/2007 | Kim et al. |
| 7,269,605 | B1 | 9/2007 | Nguyen et al. |
| 7,340,772 | B2 | 3/2008 | Panasyuk et al. |
| 7,349,913 | B2 | 3/2008 | Clark et al. |
| 7,350,085 | B2 | 3/2008 | Johnson et al. |
| 7,415,498 | B2 | 8/2008 | Russo et al. |
| 7,437,752 | B2 | 10/2008 | Heard et al. |
| 7,437,755 | B2 | 10/2008 | Farino et al. |
| 7,454,102 | B2 | 11/2008 | Keyser et al. |
| 7,490,073 | B1 | 2/2009 | Qureshi et al. |
| 7,490,352 | B2 | 2/2009 | Kramer et al. |
| 7,496,954 | B1 | 2/2009 | Himawan et al. |
| 7,502,861 | B1 | 3/2009 | Protassov et al. |
| 7,509,672 | B1 | 3/2009 | Horwitz et al. |
| 7,515,717 | B2 | 4/2009 | Doyle et al. |
| 7,526,170 | B2 | 4/2009 | Kishima |
| 7,526,800 | B2 | 4/2009 | Wright et al. |
| 7,529,923 | B2 | 5/2009 | Chartrand et al. |
| 7,574,090 | B2 | 8/2009 | Shimooka |
| 7,590,684 | B2 | 9/2009 | Herrmann |
| 7,596,593 | B2 | 9/2009 | Mitchell et al. |
| 7,599,991 | B2 | 10/2009 | Vargas et al. |
| 7,631,297 | B2 | 12/2009 | Childress et al. |
| 7,644,377 | B1 | 1/2010 | Saxe et al. |
| 7,665,125 | B2 | 2/2010 | Heard et al. |
| 7,697,737 | B2 | 4/2010 | Aull et al. |
| 7,716,240 | B2 | 5/2010 | Lim |
| 7,743,260 | B2 | 6/2010 | Fetik |
| 7,761,523 | B2 | 7/2010 | May et al. |
| 7,765,374 | B2 | 7/2010 | Field et al. |
| 7,774,323 | B2 | 8/2010 | Helfman |
| 7,779,408 | B1 | 8/2010 | Papineau |
| 7,779,458 | B1 | 8/2010 | Heiderscheit et al. |
| 7,788,535 | B2 | 8/2010 | Bussa et al. |
| 7,788,536 | B1 | 8/2010 | Qureshi et al. |
| 7,793,333 | B2 | 9/2010 | Goh et al. |
| 7,865,888 | B1 | 1/2011 | Qureshi et al. |
| 7,890,612 | B2 | 2/2011 | Todd et al. |
| 7,904,468 | B2 | 3/2011 | Neil et al. |
| 7,921,182 | B2 | 4/2011 | Hamasaki, Jr. et al. |
| 7,921,303 | B2 | 4/2011 | Mauro, II |
| 7,945,788 | B2 | 5/2011 | Roberts et al. |
| 7,950,066 | B1 | 5/2011 | Zuili |
| 7,966,323 | B2 | 6/2011 | Bocking et al. |
| 7,966,652 | B2 | 6/2011 | Ganesan |
| 7,970,386 | B2 | 6/2011 | Bhat et al. |
| 7,970,923 | B2 | 6/2011 | Pedersen et al. |
| 8,001,278 | B2 | 8/2011 | Huggahalli et al. |
| 8,012,219 | B2 | 9/2011 | Mendez et al. |
| 8,020,192 | B2 | 9/2011 | Wright et al. |
| 8,037,421 | B2 | 10/2011 | Scott et al. |
| 8,051,180 | B2 | 11/2011 | Mazzaferri et al. |
| 8,060,074 | B2 | 11/2011 | Danford et al. |
| 8,060,596 | B1 | 11/2011 | Wootton et al. |
| 8,078,713 | B1 | 12/2011 | Kim |
| 8,085,891 | B2 | 12/2011 | Owen |
| 8,095,517 | B2 | 1/2012 | Sandoval et al. |
| 8,095,786 | B1 | 1/2012 | Kshirsagar et al. |
| 8,103,765 | B2 | 1/2012 | Greifeneder et al. |
| 8,108,456 | B2 | 1/2012 | Chen et al. |
| 8,117,589 | B2 | 2/2012 | Christensen et al. |
| 8,126,128 | B1 | 2/2012 | Hicks, III et al. |
| 8,126,506 | B2 | 2/2012 | Roundtree |
| 8,132,242 | B1 | 3/2012 | Wu |
| 8,179,886 | B2 | 5/2012 | Hume et al. |
| 8,181,010 | B1 | 5/2012 | Uchil et al. |
| 8,199,507 | B2 | 6/2012 | Shohet et al. |
| 8,200,626 | B1 | 6/2012 | Katzer et al. |
| 8,214,887 | B2 | 7/2012 | Clark et al. |
| 8,233,882 | B2 | 7/2012 | Rogel |
| 8,237,068 | B2 | 8/2012 | Szaikowski |
| 8,238,256 | B2 | 8/2012 | Nugent |
| 8,239,918 | B1 | 8/2012 | Cohen |
| 8,245,285 | B1 | 8/2012 | Ravishankar et al. |
| 8,259,705 | B2 | 9/2012 | Hume |
| 8,261,231 | B1 | 9/2012 | Hirsch et al. |
| 8,272,030 | B1 | 9/2012 | Annan et al. |
| 8,285,681 | B2 | 10/2012 | Prahlad et al. |
| 8,296,239 | B2 | 10/2012 | Nonaka |
| 8,296,821 | B2 | 10/2012 | Nakae |
| 8,321,953 | B2 | 11/2012 | Jevans |
| 8,332,464 | B2 | 12/2012 | Dispensa et al. |
| 8,359,016 | B2 | 1/2013 | Lindeman et al. |
| 8,365,258 | B2 | 1/2013 | Dispensa |
| 8,365,266 | B2 | 1/2013 | Bogner |
| 8,387,110 | B1 | 2/2013 | Cooper |
| 8,402,011 | B1 | 3/2013 | Bodenhamer |
| 8,406,748 | B2 | 3/2013 | Raleigh et al. |
| 8,418,238 | B2 | 4/2013 | Platt et al. |
| 8,443,456 | B2 | 5/2013 | van der Linden |
| 8,463,128 | B2 | 6/2013 | Perret-Gentil |
| 8,463,253 | B2 | 6/2013 | Chipalkatti et al. |

(56) References Cited

U.S. PATENT DOCUMENTS

| | | |
|---|---|---|
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,489,685 B2 | 7/2013 | Bharadhwaj et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,612,582 B2 | 12/2013 | Dare et al. |
| 8,612,947 B2 | 12/2013 | LeRoux et al. |
| 8,613,070 B1 | 12/2013 | Borzycki et al. |
| 8,615,581 B2 | 12/2013 | Dare et al. |
| 8,621,620 B2 | 12/2013 | Sallam |
| 8,650,290 B2 | 2/2014 | Dare et al. |
| 8,650,303 B1 | 2/2014 | Lang et al. |
| 8,650,620 B2 | 2/2014 | Chawla et al. |
| 8,660,530 B2 | 2/2014 | Sharp et al. |
| 8,676,183 B2 | 3/2014 | Sesto |
| 8,687,814 B2 | 4/2014 | Nord et al. |
| 8,688,583 B2 | 4/2014 | Boccon-Gibod et al. |
| 8,695,060 B2 | 4/2014 | Wade et al. |
| 8,713,633 B2 | 4/2014 | Thomas |
| 8,719,898 B1 | 5/2014 | Barton et al. |
| 8,745,213 B2 | 6/2014 | Dare et al. |
| 8,756,311 B2 | 6/2014 | Dare et al. |
| 8,788,655 B2 | 7/2014 | Dare et al. |
| 8,793,758 B2 | 7/2014 | Raleigh et al. |
| 8,799,994 B2 | 8/2014 | Barton et al. |
| 8,806,570 B2 | 8/2014 | Barton et al. |
| 8,819,772 B2 | 8/2014 | Bettini et al. |
| 8,825,863 B2 | 9/2014 | Hansson et al. |
| 8,843,734 B2 | 9/2014 | Lim |
| 8,849,348 B2 | 9/2014 | Xiao et al. |
| 8,850,010 B1 | 9/2014 | Qureshi |
| 8,850,049 B1 | 9/2014 | Qureshi |
| 8,850,177 B2 | 9/2014 | Brown et al. |
| 8,850,423 B2 | 9/2014 | Barkie et al. |
| 8,850,434 B1 | 9/2014 | Butikofer et al. |
| 8,856,322 B2 | 10/2014 | Dare et al. |
| 8,856,909 B1 | 10/2014 | Chickering |
| 8,863,297 B2 | 10/2014 | Sharma et al. |
| 8,863,298 B2 | 10/2014 | Akella et al. |
| 8,863,299 B2 | 10/2014 | Sharma et al. |
| 8,869,235 B2 | 10/2014 | Qureshi et al. |
| 8,869,262 B2 | 10/2014 | Mullick et al. |
| 8,881,228 B2 | 11/2014 | Qureshi |
| 8,881,229 B2 | 11/2014 | Barton et al. |
| 8,885,096 B2 | 11/2014 | Vakil |
| 8,918,834 B1 | 12/2014 | Samuelsson |
| 8,931,038 B2 | 1/2015 | Pulier et al. |
| 8,931,042 B1 | 1/2015 | Weiss |
| 8,949,929 B2 | 2/2015 | Kelly et al. |
| 8,972,980 B2 | 3/2015 | Banga et al. |
| 9,003,387 B2 * | 4/2015 | Van Camp .............. G06F 8/65 717/170 |
| 9,043,242 B2 | 5/2015 | Kuriya et al. |
| 9,077,796 B2 | 7/2015 | Gittleman et al. |
| 9,098,715 B1 | 8/2015 | Spear, Jr. et al. |
| 9,135,418 B2 | 9/2015 | Wade et al. |
| 9,143,943 B2 | 9/2015 | Draluk et al. |
| 9,165,139 B2 | 10/2015 | Wade et al. |
| 9,171,139 B2 | 10/2015 | Newell |
| 9,183,380 B2 | 11/2015 | Qureshi et al. |
| 9,197,672 B2 | 11/2015 | Dobson et al. |
| 9,213,850 B2 | 12/2015 | Barton et al. |
| 9,256,758 B2 | 2/2016 | Draluk et al. |
| 9,280,377 B2 | 3/2016 | Lang et al. |
| 9,311,509 B2 | 4/2016 | Casper et al. |
| 9,355,253 B2 | 5/2016 | Kellerman et al. |
| 9,356,895 B2 | 5/2016 | Chiu |
| 9,367,692 B2 | 6/2016 | Brown et al. |
| 9,509,592 B2 | 11/2016 | Draluk et al. |
| 9,521,147 B2 | 12/2016 | Barton et al. |
| 9,577,985 B2 | 2/2017 | Deasy et al. |
| 9,659,169 B2 | 5/2017 | Weiss |
| 9,712,530 B2 | 7/2017 | White et al. |
| 9,716,689 B2 | 7/2017 | Andress et al. |
| 9,753,746 B2 | 9/2017 | Krzyzanowski et al. |
| 9,754,092 B2 | 9/2017 | Newell |
| 9,772,875 B2 | 9/2017 | Draluk et al. |
| 9,779,250 B1 | 10/2017 | Hui et al. |
| 9,781,594 B2 | 10/2017 | Hailpern |
| 9,971,585 B2 * | 5/2018 | Walker ...................... G06F 8/52 |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2002/0180790 A1 | 12/2002 | Broussard |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0083954 A1 | 5/2003 | Namba |
| 2003/0103075 A1 | 6/2003 | Rosselot |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0221184 A1 | 11/2003 | Gunjal et al. |
| 2003/0229623 A1 | 12/2003 | Chang et al. |
| 2003/0229786 A1 | 12/2003 | Hollis et al. |
| 2003/0236861 A1 | 12/2003 | Johnson et al. |
| 2004/0006706 A1 | 1/2004 | Erlingsson |
| 2004/0010579 A1 | 1/2004 | Freese |
| 2004/0012041 A1 | 1/2004 | West et al. |
| 2004/0083273 A1 | 4/2004 | Madison et al. |
| 2004/0096152 A1 | 5/2004 | Nakama et al. |
| 2004/0107342 A1 | 6/2004 | Pham et al. |
| 2004/0111640 A1 | 6/2004 | Baum |
| 2004/0114853 A1 | 6/2004 | Bjorkman et al. |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2004/0243349 A1 | 12/2004 | Greifeneder et al. |
| 2004/0243699 A1 | 12/2004 | Koclanes et al. |
| 2005/0027843 A1 | 2/2005 | Bozak et al. |
| 2005/0027862 A1 | 2/2005 | Nguyen et al. |
| 2005/0055578 A1 | 3/2005 | Wright et al. |
| 2005/0063637 A1 | 3/2005 | Mershon et al. |
| 2005/0076082 A1 | 4/2005 | Le Pennec et al. |
| 2005/0076085 A1 | 4/2005 | Budd et al. |
| 2005/0086328 A1 | 4/2005 | Landram et al. |
| 2005/0097608 A1 | 5/2005 | Penke et al. |
| 2005/0111354 A1 | 5/2005 | Asano et al. |
| 2005/0149340 A1 | 7/2005 | Murakami et al. |
| 2005/0166264 A1 | 7/2005 | Yamada et al. |
| 2005/0172241 A1 | 8/2005 | Daniels et al. |
| 2005/0193222 A1 | 9/2005 | Greene |
| 2005/0210252 A1 | 9/2005 | Freeman et al. |
| 2005/0210289 A1 | 9/2005 | Brown et al. |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0031679 A1 | 2/2006 | Soltis et al. |
| 2006/0048142 A1 | 3/2006 | Roese et al. |
| 2006/0070114 A1 | 3/2006 | Wood et al. |
| 2006/0075036 A1 | 4/2006 | Malik |
| 2006/0075123 A1 | 4/2006 | Burr et al. |
| 2006/0080432 A1 | 4/2006 | Spataro et al. |
| 2006/0085826 A1 | 4/2006 | Funk et al. |
| 2006/0094400 A1 | 5/2006 | Beachem et al. |
| 2006/0105479 A1 | 5/2006 | Cave et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0161783 A1 | 7/2006 | Aiken et al. |

(56) References Cited

U.S. PATENT DOCUMENTS

| | | |
|---|---|---|
| 2006/0185004 A1 | 8/2006 | Song et al. |
| 2006/0200814 A1 | 9/2006 | Kontinen et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |
| 2006/0248577 A1 | 11/2006 | Beghian et al. |
| 2006/0253508 A1 | 11/2006 | Colton et al. |
| 2006/0256739 A1 | 11/2006 | Seier et al. |
| 2006/0259755 A1 | 11/2006 | Kenoyer |
| 2006/0277590 A1 | 12/2006 | Limont et al. |
| 2006/0282876 A1 | 12/2006 | Shelest et al. |
| 2006/0282889 A1 | 12/2006 | Brown et al. |
| 2007/0005713 A1 | 1/2007 | LeVasseur et al. |
| 2007/0006289 A1 | 1/2007 | Limont et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0079249 A1 | 4/2007 | Pall et al. |
| 2007/0088825 A1 | 4/2007 | Hodul |
| 2007/0094220 A1 | 4/2007 | McCaffrey |
| 2007/0100938 A1 | 5/2007 | Bagley et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0156897 A1 | 7/2007 | Lim |
| 2007/0180447 A1 | 8/2007 | Mazzaferri et al. |
| 2007/0180509 A1 | 8/2007 | Swartz et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0253663 A1 | 11/2007 | Keyser et al. |
| 2007/0262327 A1 | 11/2007 | Shimooka |
| 2007/0266421 A1 | 11/2007 | Vaidya et al. |
| 2007/0266422 A1 | 11/2007 | Germano et al. |
| 2007/0283324 A1 | 12/2007 | Geisinger |
| 2008/0027871 A1 | 1/2008 | Seo |
| 2008/0027982 A1 | 1/2008 | Subramanian et al. |
| 2008/0040775 A1 | 2/2008 | Hoff et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0085075 A1 | 4/2008 | Kishima |
| 2008/0092215 A1 | 4/2008 | Soukup et al. |
| 2008/0127292 A1 | 5/2008 | Cooper et al. |
| 2008/0127327 A1 | 5/2008 | Carrasco |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0167002 A1 | 7/2008 | Kim et al. |
| 2008/0178169 A1 | 7/2008 | Grossner et al. |
| 2008/0178300 A1 | 7/2008 | Brown et al. |
| 2008/0183820 A1 | 7/2008 | Golovchinsky et al. |
| 2008/0183996 A1 | 7/2008 | Field et al. |
| 2008/0192739 A1 | 8/2008 | Carrasco |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0271111 A1 | 10/2008 | Cox et al. |
| 2008/0282314 A1 | 11/2008 | Abzarian et al. |
| 2008/0301639 A1 | 12/2008 | Bell et al. |
| 2008/0304665 A1 | 12/2008 | Ma et al. |
| 2008/0313257 A1 | 12/2008 | Allen et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0075630 A1 | 3/2009 | McLean |
| 2009/0077638 A1 | 3/2009 | Norman et al. |
| 2009/0083374 A1 | 3/2009 | Saint Clair |
| 2009/0100060 A1 | 4/2009 | Livnat |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172657 A1 | 7/2009 | Makelainen et al. |
| 2009/0172789 A1 | 7/2009 | Band et al. |
| 2009/0178111 A1 | 7/2009 | Moriconi et al. |
| 2009/0183227 A1 | 7/2009 | Isaacs et al. |
| 2009/0187763 A1 | 7/2009 | Freericks et al. |
| 2009/0199178 A1 | 8/2009 | Keller et al. |
| 2009/0199277 A1 | 8/2009 | Norman et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0263923 A1 | 10/2009 | Shimooka |
| 2009/0265554 A1 | 10/2009 | Robles et al. |
| 2009/0271355 A1 | 10/2009 | Sekiguchi |
| 2009/0282127 A1 | 11/2009 | Leblanc et al. |
| 2009/0282473 A1 | 11/2009 | Karlson et al. |
| 2009/0319772 A1 | 12/2009 | Singh et al. |
| 2009/0323916 A1 | 12/2009 | O'Sullivan et al. |
| 2009/0325615 A1 | 12/2009 | McKay et al. |
| 2009/0327885 A1 | 12/2009 | Aoki et al. |
| 2009/0327994 A1 | 12/2009 | Christensen et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0064354 A1 | 3/2010 | Irvine |
| 2010/0077445 A1 | 3/2010 | Schneider et al. |
| 2010/0077469 A1 | 3/2010 | Furman et al. |
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0125730 A1 | 5/2010 | Dodgson et al. |
| 2010/0146523 A1 | 6/2010 | Brigaut et al. |

(56) References Cited

U.S. PATENT DOCUMENTS

| | | |
|---|---|---|
| 2010/0146582 A1 | 6/2010 | Jaber et al. |
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0235881 A1 | 9/2010 | Liu et al. |
| 2010/0248699 A1 | 9/2010 | Dumais |
| 2010/0257580 A1 | 10/2010 | Zhao et al. |
| 2010/0262959 A1 | 10/2010 | Bruno et al. |
| 2010/0269156 A1 | 10/2010 | Hohlfeld et al. |
| 2010/0279652 A1 | 11/2010 | Sharp et al. |
| 2010/0281528 A1 | 11/2010 | Hayton et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0331017 A1 | 12/2010 | Ariga |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0078675 A1* | 3/2011 | Van Camp ............... G06F 8/65 717/170 |
| 2011/0082900 A1 | 4/2011 | Nagpal et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154305 A1 | 6/2011 | LeRoux et al. |
| 2011/0154477 A1 | 6/2011 | Parla et al. |
| 2011/0154498 A1 | 6/2011 | Fissel et al. |
| 2011/0167492 A1 | 7/2011 | Ghosh et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0230211 A1 | 9/2011 | Kim et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0296333 A1 | 12/2011 | Bateman et al. |
| 2011/0314467 A1 | 12/2011 | Pearson |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0079609 A1 | 3/2012 | Bender et al. |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0102195 A1 | 4/2012 | Adams et al. |
| 2012/0102564 A1 | 4/2012 | Schentrup et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166966 A1 | 6/2012 | Wood et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0173687 A1 | 7/2012 | Brown et al. |
| 2012/0174237 A1 | 7/2012 | Krzyzanowski |
| 2012/0179802 A1 | 7/2012 | Narasimhan et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0192181 A1 | 7/2012 | Gilbert et al. |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210068 A1 | 8/2012 | Joshi et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246191 A1 | 9/2012 | Xiong |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 | 11/2012 | Krzyzanowski et al. |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |

(56) References Cited

U.S. PATENT DOCUMENTS

| | | |
|---|---|---|
| 2013/0007842 A1 | 1/2013 | Park et al. |
| 2013/0013653 A1 | 1/2013 | Thompson |
| 2013/0013688 A1 | 1/2013 | Wang et al. |
| 2013/0013727 A1 | 1/2013 | Walker |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0031544 A1 | 1/2013 | Sridharan et al. |
| 2013/0035063 A1 | 2/2013 | Fisk et al. |
| 2013/0042294 A1 | 2/2013 | Colvin et al. |
| 2013/0042295 A1 | 2/2013 | Kelly et al. |
| 2013/0054895 A1 | 2/2013 | Tuch et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0081104 A1 | 3/2013 | Jung et al. |
| 2013/0084847 A1 | 4/2013 | Tibbitts et al. |
| 2013/0086684 A1 | 4/2013 | Mohler |
| 2013/0088605 A1 | 4/2013 | Quarfordt et al. |
| 2013/0091205 A1 | 4/2013 | Kotler et al. |
| 2013/0091440 A1 | 4/2013 | Kotler et al. |
| 2013/0091543 A1 | 4/2013 | Wade et al. |
| 2013/0095785 A1 | 4/2013 | Sadana et al. |
| 2013/0097296 A1 | 4/2013 | Gehrmann et al. |
| 2013/0097421 A1 | 4/2013 | Lim |
| 2013/0097660 A1 | 4/2013 | Das et al. |
| 2013/0103797 A1 | 4/2013 | Park et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117742 A1 | 5/2013 | Newell |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0130669 A1 | 5/2013 | Xiao et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0138932 A1 | 5/2013 | Draluk et al. |
| 2013/0138954 A1 | 5/2013 | Draluk et al. |
| 2013/0139241 A1 | 5/2013 | Leeder |
| 2013/0142043 A1 | 6/2013 | Tapia et al. |
| 2013/0144934 A1 | 6/2013 | Swett et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219022 A1 | 8/2013 | Manivel et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0227551 A1 | 8/2013 | Tsirkin |
| 2013/0227561 A1 | 8/2013 | Walsh et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0254262 A1 | 9/2013 | Udall |
| 2013/0254660 A1 | 9/2013 | Fujioka |
| 2013/0254831 A1 | 9/2013 | Roach et al. |
| 2013/0260730 A1 | 10/2013 | Toy et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0291055 A1 | 10/2013 | Muppidi et al. |
| 2013/0291086 A1 | 10/2013 | Pontillo et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0305354 A1 | 11/2013 | King et al. |
| 2013/0311593 A1 | 11/2013 | Prince et al. |
| 2013/0311597 A1 | 11/2013 | Arrouye et al. |
| 2013/0317952 A1 | 11/2013 | Tomassetti et al. |
| 2013/0318345 A1 | 11/2013 | Hengeveld |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1* | 1/2014 | Qureshi ............... G06F 21/10 726/16 |
| 2014/0012983 A1 | 1/2014 | Brown et al. |
| 2014/0020062 A1 | 1/2014 | Tumula et al. |
| 2014/0020073 A1 | 1/2014 | Ronda et al. |
| 2014/0026128 A1 | 1/2014 | Rocha De La hoz et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047413 A1 | 2/2014 | Sheive et al. |
| 2014/0047535 A1 | 2/2014 | Parla et al. |
| 2014/0049496 A1 | 2/2014 | Szalkowski |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0096230 A1 | 4/2014 | Wade |
| 2014/0108558 A1 | 4/2014 | Borzycki et al. |
| 2014/0108649 A1 | 4/2014 | Barton et al. |
| 2014/0109072 A1 | 4/2014 | Lang et al. |
| 2014/0109078 A1 | 4/2014 | Lang et al. |
| 2014/0111316 A1 | 4/2014 | Kim |
| 2014/0120961 A1 | 5/2014 | Buck |
| 2014/0122645 A1 | 5/2014 | Brown et al. |
| 2014/0130174 A1 | 5/2014 | Celi, Jr. et al. |
| 2014/0137205 A1 | 5/2014 | Brown et al. |
| 2014/0149599 A1 | 5/2014 | Krishna et al. |
| 2014/0162614 A1 | 6/2014 | Lindeman et al. |
| 2014/0164946 A1 | 6/2014 | Brown |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189670 A1 | 7/2014 | Clay |
| 2014/0189808 A1 | 7/2014 | Mahaffey et al. |
| 2014/0228014 A1 | 8/2014 | Tervo et al. |
| 2014/0280962 A1 | 9/2014 | Schultz |
| 2014/0281475 A1 | 9/2014 | Schultz |
| 2014/0281499 A1 | 9/2014 | Schentrup et al. |
| 2014/0282876 A1 | 9/2014 | Schentrup et al. |
| 2014/0283030 A1 | 9/2014 | Moore et al. |

(56) References Cited

U.S. PATENT DOCUMENTS

| | | |
|---|---|---|
| 2014/0298401 A1 | 10/2014 | Batson et al. |
| 2014/0315536 A1 | 10/2014 | Chow et al. |
| 2014/0317273 A1 | 10/2014 | Kruglick |
| 2014/0317704 A1 | 10/2014 | Schentrup et al. |
| 2014/0359117 A1 | 12/2014 | Dare et al. |
| 2014/0366015 A1 | 12/2014 | Dobson et al. |
| 2014/0379567 A1 | 12/2014 | Schentrup et al. |
| 2015/0026827 A1 | 1/2015 | Kao et al. |
| 2015/0074057 A1 | 3/2015 | Brown et al. |
| 2015/0081644 A1 | 3/2015 | Pitts |
| 2015/0082191 A1 | 3/2015 | Dietz |
| 2015/0087270 A1 | 3/2015 | Richardson et al. |
| 2015/0113502 A1 | 4/2015 | Wade |
| 2015/0113506 A1 | 4/2015 | Wade |
| 2015/0135160 A1 | 5/2015 | Gauvin et al. |
| 2015/0138945 A1 | 5/2015 | Carrillo |
| 2015/0149232 A1 | 5/2015 | Dietz |
| 2015/0205952 A1 | 7/2015 | Weiss |
| 2015/0206451 A1 | 7/2015 | Schultz |
| 2015/0227115 A1 | 8/2015 | Dietz |
| 2015/0277941 A1 | 10/2015 | Dobson et al. |
| 2015/0341362 A1 | 11/2015 | Dobson et al. |
| 2015/0378581 A1 | 12/2015 | Dietz |
| 2015/0379475 A1 | 12/2015 | Dietz |
| 2016/0057559 A1 | 2/2016 | Deasy et al. |
| 2016/0156547 A1 | 6/2016 | Draluk et al. |
| 2016/0337844 A1 | 11/2016 | Hailpern |
| 2017/0063839 A1 | 3/2017 | Barton et al. |
| 2017/0244724 A1 | 8/2017 | Deasy et al. |

FOREIGN PATENT DOCUMENTS

| | | |
|---|---|---|
| CN | 1661610 A | 8/2005 |
| CN | 1708751 A | 12/2005 |
| CN | 1713199 A | 12/2005 |
| CN | 1849774 A | 10/2006 |
| CN | 1894897 A | 1/2007 |
| CN | 1951060 A | 4/2007 |
| CN | 101170401 A | 4/2008 |
| CN | 101305378 A | 11/2008 |
| CN | 101322379 A | 12/2008 |
| CN | 101350814 A | 1/2009 |
| CN | 101453708 A | 6/2009 |
| CN | 101572678 A | 11/2009 |
| CN | 101588353 A | 11/2009 |
| CN | 101727274 A | 6/2010 |
| CN | 101888597 A | 11/2010 |
| CN | 102422553 A | 4/2012 |
| CN | 102541635 A | 7/2012 |
| CN | 102591802 A | 7/2012 |
| CN | 102986190 A | 3/2013 |
| CN | 103299658 A | 9/2013 |
| CN | 104854561 A | 8/2015 |
| EP | 1465039 A1 | 10/2004 |
| EP | 2028805 A1 | 2/2009 |
| EP | 2403211 A1 | 1/2012 |
| EP | 2428894 A1 | 3/2012 |
| EP | 2523107 A1 | 11/2012 |
| EP | 2573701 A1 | 3/2013 |
| GB | 2411320 A | 8/2005 |
| GB | 2462442 A | 2/2010 |
| GB | 2478653 A | 9/2011 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |
| JP | 2008-033751 A | 2/2008 |
| JP | 2008-097419 A | 4/2008 |
| JP | 2008-160753 A | 7/2008 |
| JP | 2008-527574 A | 7/2008 |
| JP | 2009-070073 A | 4/2009 |
| JP | 2009-520409 A | 5/2009 |
| JP | 2009169661 A | 7/2009 |
| JP | 2009-289164 A | 12/2009 |
| JP | 2010-015601 A | 1/2010 |
| JP | 2010-079901 A | 4/2010 |
| JP | 2011-138446 A | 7/2011 |
| JP | 2011-191897 A | 9/2011 |
| JP | 2011-248888 A | 12/2011 |
| JP | 2013-058223 A | 3/2013 |
| KR | 10-0806993 B1 | 2/2008 |
| KR | 2012-0118819 A | 10/2012 |
| KR | 10-2012-0128376 A | 11/2012 |
| WO | 9914652 A1 | 3/1999 |
| WO | 02084460 A2 | 10/2002 |
| WO | 2004107646 A1 | 12/2004 |
| WO | 2006/012612 A1 | 2/2006 |
| WO | 2007113709 A1 | 10/2007 |
| WO | 2008086611 A1 | 7/2008 |
| WO | 2009021200 A1 | 2/2009 |
| WO | 2009/157493 A1 | 12/2009 |
| WO | 2010054258 A1 | 5/2010 |
| WO | 2010115289 A1 | 10/2010 |
| WO | 2013020177 A1 | 2/2013 |
| WO | 2013070813 A1 | 5/2013 |
| WO | 2014/032051 A1 | 2/2014 |
| WO | 2015/023887 A1 | 2/2015 |

OTHER PUBLICATIONS

Jun. 7, 2018—(JP) Decision of Refusal—App. 2016-226192.
Jun. 8, 2018—U.S. Notice of Allowance—U.S. Appl. No. 15/140,683.
Jun. 28, 2018—U.S. Non-final Office Action—U.S. Appl. No. 15/946,692.
Jul. 23, 2018—(EP) Examination Report—App 13779976.3.
Aug. 2, 2018—(JP) Decision to Grant—App. 2017-081340.
Aug. 2, 2018—(JP) Notification of Reasons for Refusal—App. 2017-098391.
Sep. 14, 2018—U.S. Non-final Office Action—U.S. Appl. No. 15/057,314.
Sep. 20, 2018—U.S. Final Office Action—U.S. Appl. No. 14/021,227.
Jun. 30, 2016—U.S. Non-final Office Action—U.S. Appl. No. 14/752,132.
Mar. 26, 2015—U.S. Non-Final Office Action—U.S. Appl. No. 14/055,038.
Nov. 12, 2015—U.S. Final Office Action—U.S. Appl. No. 14/055,038.
Mar. 16, 2016—U.S. Notice of Allowance—U.S. Appl. No. 14/106,171.
Mar. 30, 2016—U.S. Final Office Action—U.S. Appl. No. 13/963,739.
Apr. 7, 2016—U.S. Non-final Office Action—U.S. Appl. No. 14/340,096.
Apr. 4, 2016—U.S. Notice of Allowance—U.S. Appl. No. 14/607,593.
Apr. 25, 2016—U.S. Non-final Office Action—U.S. Appl. No. 14/508,245.
Jun. 22, 2016—U.S. Final Office Action—U.S. Appl. No. 13/963,833.
Jul. 15, 2016—U.S. Non-final Office Action—U.S. Appl. No. 14/932,293.
Jul. 28, 2016—U.S. Non-final Office Action—U.S. Appl. No. 14/055,038.
Jul. 27, 2016—U.S. Notice of Allowance—U.S. Appl. No. 14/607,593.
Aug. 8, 2016—U.S. Final Office Action—U.S. Appl. No. 14/022,935.
Aug. 2, 2016—U.S. Notice of Allowance—U.S. Appl. No. 14/535,597.
Aug. 11, 2016—U.S. Notice of Allowance—U.S. Appl. No. 14/340,096.
Aug. 17, 2016—U.S. Non-Final Office Action—U.S. Appl. No. 14/733,490.
Aug. 23, 2016—U.S. Notice of Allowance—U.S. Appl. No. 13/649,073.
Sep. 9, 2016—U.S. Non-final Office Action—U.S. Appl. No. 14/876,832.
Oct. 26, 2016—U.S. Non-Final Office Action—U.S. Appl. No. 14/026,442.
Oct. 25, 2016—U.S. Non-final Office Action—U.S. Appl. No. 15/057,314.
Nov. 16, 2016—U.S. Notice of Allowance—U.S. Appl. No. 14/671,351.
Dec. 2, 2016—U.S. Notice of Allowance—U.S. Appl. No. 14/607,593.
Jan. 3, 2017—U.S. Notice of Allowance—U.S. Appl. No. 14/508,245.
Jan. 11, 2017—U.S. Non-Final Office Action—U.S. Appl. No. 13/963,833.
Jan. 17, 2017—U.S. Final Office Action—U.S. Appl. No. 14/876,832.

(56) References Cited

OTHER PUBLICATIONS

Jan. 18, 2017—U.S. Non-final Office Action—U.S. Appl. No. 14/021,227.
Feb. 23, 2017—U.S. Non-final Office Action—U.S. Appl. No. 14/025,898.
Mar. 2, 2017—U.S. Final Office Action—U.S. Appl. No. 14/733,490.
Apr. 13, 2017—U.S. Final Office Action—U.S. Appl. No. 14/055,038.
Apr. 20, 2017—U.S. Non-final Office Action—U.S. Appl. No. 14/039,651.
Apr. 21, 2017—U.S. Non-final Office Action—U.S. Appl. No. 15/422,761.
May 22, 2017—U.S. Final Office Action—U.S. Appl. No. 15/057,314.
May 19, 2017—U.S. Notice of Allowance and Fee(s) Due—U.S. Appl. No. 14/026,442.
May 24, 2017—U.S. Non-final Office Action—U.S. Appl. No. 14/932,293.
Jun. 1, 2017—U.S. Final Office Action—U.S. Appl. No. 13/963,833.
Jun. 5, 2017—U.S. Non-Final Office Action—U.S. Appl. No. 14/733,490.
Aug. 10, 2017—U.S. Final Office Action—U.S. Appl. No. 14/039,651.
Aug. 18, 2017—U.S. Non-final Office Action—U.S. Appl. No. 15/345,584.
Aug. 22, 2017—U.S. Non-final Office Action—U.S. Appl. No. 15/347,247.
Aug. 24, 2017—U.S. Final Office Action—U.S. Appl. No. 14/025,898.
Aug. 3, 2017—(JP) Office Action—App 2016-512957.
Aug. 31, 2017—U.S. Non-final Office Action—U.S. Appl. No. 14/932,293.
Aug. 30, 2017—U.S. Notice of Allowance—U.S. Appl. No. 15/422,761.
Sep. 14, 2017—U.S. Notice of Allowance—U.S. Appl. No. 14/733,490.
Jan. 11, 2018—U.S. Notice of Allowance—U.S. Appl. No. 14/752,132.
Jan. 22, 2018—U.S. Final Office Action—U.S. Appl. No. 14/932,293.
Dec. 26, 2017—(CN) Notice of First Office Action—App 201380076963.3.
Jan. 25, 2018—U.S. Notice of Allowance—U.S. Appl. No. 14/025,898.
Dec. 22, 2014—U.S. Non-Final Office Action—U.S. Appl. No. 13/649,069.
Feb. 12, 2015—U.S. Non-Final Office Action—U.S. Appl. No. 13/963,833.
Feb. 18, 2015—U.S. Non-Final Office Action—U.S. Appl. No. 14/043,229.
Dec. 20, 2013 (WO) International Search Report and Written Opinion—App PCT/US2013/063363.
Dec. 19, 2014—U.S. Non-Final Office Action—U.S. Appl. No. 14/043,331.
Mar. 5, 2015 U.S. Non-Final Office Action—U.S. Appl. No. 14/039,651.
Apr. 2, 2015—U.S. Final Office Action—U.S. Appl. No. 14/022,935.
Mar. 25, 2015—U.S. Non-Final Office Action—U.S. Appl. No. 14/044,919.
Apr. 6, 2015—U.S. Non-Final Office Action—U.S. Appl. No. 14/039,632.
Apr. 14, 2015—U.S. Notice of Allowance & Fees Due—U.S. Appl. No. 14/043,086.
Apr. 16, 2015—U.S. Notice of Allowance & Fees Due—U.S. Appl. No. 13/886,765.
Jul. 11, 2014 (WO) International Search Report and Written Opinion—App PCT/US2013/63261.
May 19, 2015—U.S. Notice of Allowance & Fees Due—U.S. Appl. No. 13/648,993.
May 22, 2015—U.S. Non-Final Office Action—U.S. Appl. No. 14/106,171.
2011—Laverty, Joseph Packy et al., "Comparative Analysis of Mobile Application Development and Security Models," Issues in Information Systems vol. XII, No. 1, [Retrieved from the Internet] <http://iacis.org/iis/2011/301-312_AL2011_1694.pdf> pp. 301-312.
2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.
1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.
2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.
May 20, 2015—U.S. Notice of Allowance & Fees Due—U.S. Appl. No. 13/649,022.
May 20, 2015—U.S. Notice of Allowance & Fees Due—U.S. Appl. No. 13/649,069.
Jun. 5, 2015—U.S. Final Office Action—U.S. Appl. No. 13/649,071.
Jun. 9, 2015—U.S. Notice of Allowance—U.S. Appl. No. 14/043,229.
Jun. 15, 2015—U.S. Non-Final Office Action—U.S. Appl. No. 13/649,076.
Jun. 18, 2015—U.S. Non-Final Office Action—U.S. Appl. No. 14/043,902.
Jun. 23, 2015—U.S. Notice of Allowance—U.S. Appl. No. 14/043,229.
2008—Administration Guide for Symantec Endpoint Protection and Symantec Network Access Control; Retrieved from the Internet <<URL:ftp.symantec.com/public/english_us_canada/products/symantec_endpointprotection/11.0/manuals/administration_guide.pdf>; pp. 1-615.
2007—Symantec Network Access Control Enforcer Implementation Guide; Retrieved from the Internet <URL:ftp.symantec.com/public/english_us_canada/products/symantec_network_access_control/11.0/manuals/enforcer_implementation_guide.pdf>; pp. 1-132.
Jul. 6, 2015—U.S. Notice of Allowance—U.S. Appl. No. 13/649,024.
Jul. 9, 2015—U.S. Final Offcie Action—U.S. Appl. No. 13/963,833.
Jul. 8, 2015—U.S. Non-Final Office Action—U.S. Appl. No. 14/340,096.
Jul. 22, 2015—U.S. Notice of Allowance—U.S. Appl. No. 13/963,758.
Jul. 23, 2015—U.S. Non-Final Office Action—U.S. Appl. No. 14/025,898.
Jul. 29, 2015—U.S. Final Office Action—U.S. Appl. No. 13/886,889.
Aug. 4, 2015—U.S. Non-Final Office Action—U.S. Appl. No. 13/963,739.
Aug. 5, 2015—U.S. Notice of Allowance—U.S. Appl. No. 13/886,765.
Aug. 7, 2015—U.S. Final Office Action—U.S. Appl. No. 14/043,331.
Aug. 14, 2015—U.S. Non-final Office Action—U.S. Appl. No. 14/040,831.
Aug. 17, 2015—U.S. Final Office Action—U.S. Appl. No. 14/039,632.
Aug. 20, 2015—U.S. Non-Final Office Action—U.S. Appl. No. 14/242,011.
Aug. 21, 2015—U.S. Final Office Action—U.S. Appl. No. 14/039,651.
Aug. 24, 2015—U.S. Non-final Office Action—U.S. Appl. No. 14/535,597.
Aug. 14, 2015—U.S. Notice of Allowance—U.S. Appl. No. 14/044,919.
Aug. 26, 2015—U.S. Final Office Action—U.S. Appl. No. 14/027,929.
Sep. 2, 2015—U.S. Notice of Allowance—U.S. Appl. No. 13/649,071.
Sep. 22, 2015—U.S. Non-final Office Action—U.S. Appl. No. 14/607,593.
Oct. 8, 2015—U.S. Final Office Action—U.S. Appl. No. 14/015,194.
Oct. 9, 2015—U.S. Final Office Action—U.S. Appl. No. 14/043,902.
Oct. 9, 2015—U.S. Notice of Allowance—U.S. Appl. No. 13/886,889.
Oct. 28, 2015—U.S. Notice of Allowance—U.S. Appl. No. 13/886,889.
Nov. 3, 2015—U.S. Non-Final Office Action—U.S. Appl. No. 14/733,490.
Jan. 24, 2014 U.S. Non-final Office Action—U.S. Appl. No. 13/963,851.
Feb. 4, 2014 (WO) International Search Report and Written Opinion—App. PCT/US2013/064349.
Feb. 24, 2014 U.S. Non-final Office Action—U.S. Appl. No. 14/044,901.
Feb. 24, 2014 U.S. Non-final Office Action—U.S. Appl. No. 13/963,833.
Feb. 24, 2014 U.S. Non-final Office Action—U.S. Appl. No. 13/649,073.
Nov. 15, 2013 U.S. Non-Final Office Action—U.S. Appl. No. 14/015,108.

(56) References Cited

OTHER PUBLICATIONS

Jan. 21, 2014 (WO) International Search Report and Written Opinion in International—App. PCT/US2013/063856.
Dec. 23, 2013 U.S. Non-Final Office Action—U.S. Appl. No. 14/043,343.
Dec. 30, 2013 U.S. Non-Final Office Action—U.S. Appl. No. 14/043,164.
Dec. 19, 2013 U.S. Non-Final Office Action—U.S. Appl. No. 14/032,706.
Jan. 2013—Apple Inc., iPad User Guide for iOS 6.1 Software, Chapter 26, Accessibility, pp. 107-108.
Feb. 28, 2014 U.S. Non-final Office Action—U.S. Appl. No. 14/096,380.
Mar. 18, 2014 U.S. Non-Final Office Action—U.S. Appl. No. 13/649,064.
Feb. 24, 2014 (WO) International Search Report and Written Opinion—App PCT/US2013/060379.
Mar. 6, 2014 (WO) International Search Report and Written Opinion in International Application No. PCT/US2013/064319.
Mar. 20, 2014 U.S. Non-Final Office Action—U.S. Appl. No. 13/649,071.
Feb. 6, 2014 (WO) International Search Report and Written Opinion—App. PCT/US2013/064076.
Mar. 25, 2014 (US) Non-Final Office Action—U.S. Appl. No. 14/043,086.
Mar. 17, 2014 (WO) International Search Report and Written Opinion—App. PCT/US2013/064279.
Mar. 27, 2014 U.S. Final Office Action—U.S. Appl. No. 13/963,758.
Mar. 27, 2014 U.S. Non-final Office Action—U.S. Appl. No. 13/649,069.
Mar. 6, 2014 U.S. Non-Final Office Action—U.S. Appl. No. 14/041,946.
Mar. 28, 2014 U.S. Final Office Action—U.S. Appl. No. 14/022,935.
Apr. 7, 2014 U.S. Final Office Action—U.S. Appl. No. 14/029,077.
Apr. 8, 2014 U.S. Non-Final Office Action—U.S. Appl. No. 13/886,889.
Apr. 4, 2014 (WO) International Search Report and Written Opinion—App. PCT/US2013/063429.
Jul. 31, 2012—"Citrix XenMobile Technology Overview: White Paper," Citrix White Papers online, pp. 1-14; retrieved from http://insight.com/content/aam/insight/en_US/pdfs/citrix/xenmobile-tech-overview.pdf, retrieved Jan. 27, 2014.
Apr. 11, 2014 U.S. Final Office Action—U.S. Appl. No. 14/015,108.
Apr. 14, 2014 U.S. Notice of Allowance—U.S. Appl. No. 14/032,706.
Apr. 21, 2014 U.S. Final Office Action—U.S. Appl. No. 14/096,380.
May 2, 2014 U.S. Non-Final Office Action—U.S. Appl. No. 14/044,972.
May 7, 2014 U.S. Final Office Action—U.S. Appl. No. 14/029,088.
May 7, 2014 U.S. Final Office Action—U.S. Appl. No. 14/029,068.
May 8, 2014 U.S. Final Office Action—U.S. Appl. No. 14/029,096.
May 5, 2014 U.S. Notice of Allowance—U.S. Appl. No. 14/044,928.
May 19, 2014 U.S. Notice of Allowance—U.S. Appl. No. 14/044,901.
May 16, 2014 U.S. Final Office Action—U.S. Appl. No. 14/044,998.
May 16, 2014 U.S. Final Office Action—U.S. Appl. No. 14/096,418.
May 19, 2014 U.S. Non-Final Office Action—U.S. Appl. No. 13/649,076.
May 20, 2014 U.S. Non-Final Office Action—U.S. Appl. No. 14/044,989.
May 29, 2014 U.S. Notice of Allowance—U.S. Appl. No. 14/043,343.
May 29, 2014 U.S. Final Office Action—U.S. Appl. No. 14/041,911.
Jun. 4, 2014 U.S. Notice of Allowance—U.S. Appl. No. 14/032,439.
Jun. 4, 2014 U.S. Final Office Action—U.S. Appl. No. 14/032,820.
Jun. 2, 2014 U.S. Notice of Allowance—U.S. Appl. No. 14/032,756.
May 27, 2014 U.S. Notice of Allowance—U.S. Appl. No. 14/042,984.
Jun. 6, 2014 U.S. Final Office Action—U.S. Appl. No. 14/032,885.
Mar. 27, 2018—U.S. Final Office Action—U.S. Appl. No. 15/057,314.
Apr. 5, 2018—U.S. Final Office Action—U.S. Appl. No. 14/876,832.
Apr. 19, 2018—U.S. Non-final Office Action—U.S. Appl. No. 15/863,853.
Nov. 5, 2015—(EP) Office Action—App 13773923.1.
Nov. 23, 2015—U.S. Non-final Office Action—U.S. Appl. No. 14/032,643.
Dec. 2, 2015—U.S. Non-final Office Action—U.S. Appl. No. 14/021,227.
Dec. 10, 2015—U.S. Final Office Action—U.S. Appl. No. 14/340,096.
Dec. 14, 2015—U.S. Non-final Office Action—U.S. Appl. No. 14/022,935.
Dec. 18, 2015 U.S. Non-final Office Action—U.S. Appl. No. 14/039,632.
Dec. 22, 2015—U.S. Final Office Action—U.S. Appl. No. 14/106,171.
Jan. 21, 2016—U.S. Non-final Office Action—U.S. Appl. No. 13/649,073.
Feb. 3, 2016—U.S. Notice of Allowance—U.S. Appl. No. 14/040,831.
Feb. 23, 2016—U.S. Non-Final Office Action—U.S. Appl. No. 14/039,651.
Feb. 29, 2016—U.S. Ex parte Quayle—U.S. Appl. No. 14/242,011.
Feb. 24, 2016—U.S. Notice of Allowance—U.S. Appl. No. 14/015,194.
Feb. 29, 2016—U.S. Notice of Allowance—U.S. Appl. No. 13/649,076.
Mar. 25, 2016—(CN) Office Action—App 201380057326.1.
May 12, 2016—U.S. Final Office Action—U.S. Appl. No. 14/733,490.
May 13, 2016—U.S. Notice of Allowance—U.S. Appl. No. 13/963,739.
May 20, 2016—U.S. Notice of Allowance—U.S. Appl. No. 14/032,643.
2005—Hamed, H. et al., "Modeling and verification of IPSec and VPN security policies," 13th IEEE International Conference on Network Protocols (ICNP'05), pp. 10.
Nov. 2004—Skarmeta, A. et al., "Policy-based dynamic provision of IP services in a secure VPN coalition scenario," in IEEE Communications Magazine, vol. 42, No. 11, pp. 118-124.
Jun. 7, 2016—U.S. Notice of Allowance—U.S. Appl. No. 14/242,011.
Jun. 20, 2016—(EP) Extended European Search Report—13795317.
Jun. 22, 2016—U.S. Final Office Action—U.S. Appl. No. 14/025,898.
Nov. 13, 2015 (WO) International Search Report and Written Opinion—App. PCT/US2015/026781.
Mar. 11, 2008—Vejda, T. et al., "Towards Trust Services for Language-Based Virtual Machines for Grid Computing," Trusted Computing—Challenges and Applications, ISBN: 978-3-540-68978-2.
Apr. 8, 2016—U.S. Non-final Office Action—U.S. Appl. No. 14/671,351.
Jul. 12, 2016—U.S. Final Office Action—U.S. Appl. No. 14/021,277.
Jul. 7, 2016—(EP) Supplementary European Search Report—App 13795317.0.
Jul. 29, 2016 (KR) Office Action—App. 10-2015-7031152.
Oct. 20, 2016—U.S. Final Office Action—U.S. Appl. No. 14/039,651.
Symantec: "What are Managed Applications and What is the Difference Between Assigned and Published;" Jan. 7, 2002; pp. 1-5.
Tilakgovind: "Understanding the Difference Between .exe and .msi: Symantec Connect;" Jan. 15, 2008.
Oct. 11, 2016 (WO) International Search Report and Written Opinion—App No. PCT/US2016/039229.
Nov. 1, 2016 (KR) Office Action—App. 10-2012-7001062.
Oct. 28, 2016 (JP) Notice of Reasons for Refusal—App. 2016-505458.
Nov. 25, 2016—U.S. Non-final Office Action—U.S. Appl. No. 14/055,038.
Oct. 28, 2016 (JP) Notification of Reason for Refusal—App. 2016-505457.
Oct. 14, 2016—(KR) Office Action—App 10-2015-7031149.
Jan. 19, 2017 (JP) Notification of Reasons for Refusal—App. 2016-505456.
Feb. 21, 2017—(CN) First Chinese Office Action—App. 2013800657267, Machine Eng Tran.
Feb. 8, 2017—(CN) First Office Action—App No. 201380064191.1—Eng Trans.
Mar. 3, 2017—(CN) First Office Action—App 201380065897X.
Mar. 3, 2017—(CN) Second Office Action—App 2014800364260.
Jan. 17, 2017—(CN) Office Action—App 201380063467.4.
Apr. 18, 2017—(CN) Office Action—App 201380063087.0.
May 3, 2017 (CN) Decision of Rejection—App 2013800573261.
May 31, 2017 (CN) First Office Action—App. 201380077065.X.
Jun. 28, 2017—U.S. Final Office Action—U.S. Appl. No. 14/752,132.
Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.

(56) References Cited

OTHER PUBLICATIONS

Feb. 10, 2014 (WO) International Search Report—App PCT/US/2013/065245.
Oct. 22, 2014—U.S. Non-Final Office Action—U.S. Appl. No. 14/055,078.
Jun. 17, 2015—U.S. Notice of Allowance—U.S. Appl. No. 14/055,078.
Aug. 1, 2012—"TPS Development Using the Microsoft .NET Framework", Teresa P. Lopes, IEEE Instrumentation & Measurement Magazine (vol. 15, No. 4).
Dec. 6, 2013 U.S. Notice of Allowance—U.S. Appl. No. 14/022,845.
Dec. 20, 2013 U.S. Non-Final Office Action—U.S. Appl. No. 14/044,998.
Dec. 18, 2013 U.S. Non-final Office Action—U.S. Appl. No. 14/044,928.
Dec. 24, 2013 U.S. Non-final Office Action—U.S. Appl. No. 14/022,935.
Jan. 17, 2014 U.S. Non-final Office Action—U.S. Appl. No. 14/045,005.
Jan. 30, 2014 U.S. Non-final Office Action—U.S. Appl. No. 14/045,014.
Feb. 3, 2014 U.S. Non-Final Office Action—U.S. Appl. No. 14/044,946.
Feb. 10, 2014 U.S. Non-Final Office Action—U.S. Appl. No. 14/96,418.
Dec. 10, 2013 U.S. Non-final Office Action—U.S. Appl. No. 14/015,245.
Dec. 20, 2013 U.S. Non-final Office Action—U.S. Appl. No. 14/043,301.
Dec. 27, 2013 U.S. Non-Final Office Action—U.S. Appl. No. 14/042,941.
Dec. 27, 2013 U.S. Non-Final Office Action—U.S. Appl. No. 14/043,012.
Dec. 31, 2013 U.S. Non-Final Office Action—U.S. Appl. No. 14/042,984.
Jan. 6, 2014 U.S. Non-final Office Action—U.S. Appl. No. 14/043,229.
Dec. 23, 2013 U.S. Notice of Allowance—U.S. Appl. No. 14/041,923.
Jan. 24, 2014 U.S. Non-final Office Action—U.S. Appl. No. 14/041,935.
Dec. 16, 2013 U.S. Office Action—U.S. Appl. No. 14/041,911.
Dec. 5, 2013 U.S. Office Action—U.S. Appl. No. 14/029,096.
Dec. 13, 2005—Lowe, "Application-Specific VPNs".
Dec. 5, 2013 U.S. Office Action—U.S. Appl. No. 14/029,088.
Dec. 19, 2013 U.S. Office Action—U.S. Appl. No. 14/029,077.
Dec. 5, 2013 U.S. Office Action—U.S. Appl. No. 14/029,068.
Dec. 19, 2013 U.S. Non-Final Office Action—U.S. Appl. No. 14/032,885.
Jan. 9, 2014 U.S. Non-final Office Action—U.S. Appl. No. 14/032,756.
Jan. 10, 2014 U.S. Non-final Office Action—U.S. Appl. No. 14/032,820.
Feb. 4, 2014 U.S. Non-final Office Action—U.S. Appl. No. 14/032,643.
Feb. 3, 2014 U.S. Non-Final Office Action—U.S. Appl. No. 14/032,439.
Nov. 7, 2013 U.S. Non-final Office Action—U.S. Appl. No. 13/649,063.
Nov. 22, 2013 U.S. Restriction Requirement—U.S. Appl. No. 13/649,071.
Nov. 26, 2013 (WO) International Search Report and Written Opinion—App. PCT/US2013/060388.
Jan. 13, 2013 U.S. Restriction Requirement—U.S. Appl. No. 13/649,076.
Jan. 17, 2014 U.S. Non-Final Office Action—U.S. Appl. No. 13/648,993.
Apr. 2013—Xuetao Wei, et al., "Malicious Android Applications in the Enterprise: What Do They Do and How Do We Fix It?,"? ICDE Workshop on Secure Data Management on Smartphones and Mobiles, 4 pages.
Notification of Concurrently Filed Applications in 1 page.
Oct. 17, 2013 U.S. Office Action—U.S. Appl. No. 13/963,794.
2012—Ranjan et al., "Programming Cloud Resource Orchestration Framework: Operations and Research Challenges", arxiv.org, pp. 1-19.
2010—Na et al., "Personal Cloud Computing Security Framework," 2010 IEEE Asia-Pacific Computing Conference, pp. 671-675.
Oct. 25, 2013 U.S. Notice of Allowance—U.S. Appl. No. 13/963,825.
2003—Wilson et al., "Unified Security Framework", In proceedings of the 1st International Symposium on Information and Communication Technologies, pp. 500-505. Trinity College Dublin.
2003—Mysore et al., "The Liquid Media System—a Multi-Device Streaming Media Orchestration Framework", Ubicomp 2003 Workshop, pp. 1-4.
Nov. 8, 2013 U.S. Office Action—U.S. Appl. No. 13/963,811.
Nov. 6, 2013 U.S. Office Action—U.S. Appl. No. 13/963,825.
Dec. 19, 2013 U.S. Restriction Requirement—U.S. Appl. No. 13/963,833.
Dec. 19, 2013 U.S. Non-final Office Action—U.S. Appl. No. 13/963,758.
Jan. 10, 2014 (WO) Written Opinion and International Search Report—App. PCT/US2013/062636.
May 27, 2014 U.S. Notice of Allowance—U.S. Appl. No. 14/015,245.
Jun. 3, 2014 (WO) International Search Report and Written Opinion—App. PCT/US2013/060047.
Jul. 1, 2011—Wright et al., "Your Firm's Mobile Devices: How Secure are They?" Journal of Corporate Accounting and Finance, Willey Periodicals. pp. 13-21.
Jun. 23, 2014 U.S. Final Office Action—U.S. Appl. No. 14/044,946.
Jun. 24, 2014 U.S. Final Office Action—U.S. Appl. No. 14/043,229.
Jun. 24, 2014 U.S. Notice of Allowance—U.S. Appl. No. 13/649,063.
Jul. 9, 2014 U.S. Notice of Allowance—U.S. Appl. No. 13/649,064.
Jun. 26, 2014 U.S. Notice of Allowance—U.S. Appl. No. 14/042,941.
Jul. 18, 2014 U.S. Final Office Action—U.S. Appl. No. 13/963,833.
Jul. 10, 2014 U.S. Notice of Allowance—U.S. Appl. No. 14/044,972.
Jul. 11, 2014—U.S. Non-Final Office Action—U.S. Appl. No. 13/649,024.
Jul. 24, 2014 U.S. Final Office Action—U.S. Appl. No. 14/032,643.
Jul. 17, 2014—U.S. Non-Final Office Action—U.S. Appl. No. 13/649,022.
Jul. 28, 2014 U.S. Final Office Action—U.S. Appl. No. 13/649,069.
Jul. 29, 2014 U.S. Notice of Allowance—U.S. Appl. No. 11/043,164.
Jul. 21, 2014 U.S. Notice of Allowance—U.S. Appl. No. 14/043,012.
Aug. 7, 2014 U.S. Final Office Action—U.S. Appl. No. 14/043,086.
Aug. 7, 2014 U.S. Final Office Action—U.S. Appl. No. 13/963,851.
Aug. 30, 2014 U.S. Notice of Allowance—U.S. Appl. No. 14/029,088.
Aug. 1, 2014 U.S. Notice of Allowance—U.S. Appl. No. 14/041,946.
Aug. 5, 2014 U.S. Notice of Allowance—U.S. Appl. No. 14/029,096.
Aug. 7, 2014 U.S. Notice of Allowance—U.S. Appl. No. 14/029,068.
Aug. 21, 2014 U.S. Final Office Action—U.S. Appl. No. 14/043,301.
Jul. 3, 2014 U.S. Final Office Action—U.S. Appl. No. 14/045,014.
Aug. 29, 2014—U.S. Final Office Action—U.S. Appl. No. 13/649,073.
Oct. 25, 2010—Andreas, "Digging into the Exchange ActiveSync Protocol," Mobility Dojo.net, http://mobilitydojo.net/2010/03/17/digging-into-the-exchange-activesync-protocol/.
Aug. 29, 2014—U.S. Final Office Action—U.S. Appl. No. 13/649,076.
Aug. 8, 2014—U.S. Notice of Allowance—U.S. Appl. No. 14/032,885.
Sep. 5, 2014—U.S. Non-Final Office Action—U.S. Appl. No. 13/648,993.
Sep. 8, 2014—U.S. Final Office Action—U.S. Appl. No. 13/886,889.
Sep. 18, 2014—U.S. Final Office Action—U.S. Appl. No. 13/649,071.
Sep. 26, 2014—U.S. Final Office Action—U.S. Appl. No. 14/044,989.
Oct. 6, 2014—U.S. Notice of Allowance—U.S. Appl. No. 14/041,911.
Oct. 10, 2014—U.S. Final Office Action—U.S. Appl. No. 14/032,643.
Oct. 20, 2014 (WO) International Search Report—App PCT/US2014/036382.
Nov. 21, 2014—U.S. Non-Final Office Action—U.S. Appl. No. 14/044,946.
Nov. 5, 2014—U.S. Non-Final Office Action—U.S. Appl. No. 14/045,014.
Nov. 5, 2014—U.S. Non-Final Offie Action—U.S. Appl. No. 13/886,765.
Nov. 26, 2014—U.S. Non-Final Office Action—U.S. Appl. No. 13/963,851.
Sep. 29, 2014 (WO) International Search Report—App PCT/US2014/036326.
Nov. 24, 2014—U.S. Notice of Allowance—U.S. Appl. No. 14/043,301.
Jan. 5, 2015—U.S. Non-Final Office Action—U.S. Appl. No. 14/027,929.
Jan. 7, 2015—U.S. Notice of Allowance & Fees Due—U.S. Appl. No. 14/045,014.
Jan. 22, 2015 U.S. Notice of Allowance—U.S. Appl. No. 13/963,851.
Dec. 29, 2014—U.S. Final Office Action—U.S. Appl. No. 13/649,022.

(56) References Cited

OTHER PUBLICATIONS

Jan. 5, 2015—U.S. Non-Final Office Action—U.S. Appl. No. 13/649,071.
Jan. 26, 2015—U.S. Non-Final Office Action—U.S. Appl. No. 13/886,889.
Jan. 27, 2015—U.S. Non-Final Office Action—U.S. Appl. No. 13/963,758.
Jun. 14, 2017 (KR) Korean Intellectual Property Office Notice to Submit a Response—App. 10-2015-7031148.
Jun. 9, 2017—(CN) First Office Action—App 2013800627647.
Jul. 7, 2017—U.S. Non-final Office Action—U.S. Appl. No. 14/875,450.
Jul. 17, 2017—U.S. Final Office Action—U.S. Appl. No. 14/876,832.
Jul. 27, 2017—U.S. Final Office Action—U.S. Appl. No. 14/021,227.
Jul. 3, 2017—(CN) Second Office Action—App 2013800641911.
Ikuki Matsuhisa, Telecommunication, RIC Telecom, Sep. 25, 2011, vol. 28, No. 10, pp. 66-69.
Sep. 22, 2017—U.S. Non-final Office Action—U.S. Appl. No. 14/055,038.
Oct. 3, 2017—U.S. Non-final Office Action—U.S. Appl. No. 15/057,314.
Dec. 4, 2017—U.S. Notice of Allowance—U.S. Appl. No. 14/875,450.
Nov. 30, 2017—(JP) Notification of Reasons for Refusal—App 2016-226192.
"General review of latest approaches for BYOD Safely use business apps from personal terminal," Nikkei Communication, Nikkei Business Publications, Inc., Jun. 1, 2012, No. 581, pp. 27-37.
Nov. 13, 2017—(CN) Decision of Rejection—App No. 2013800641911.
Dec. 15, 2017—U.S. Non-final Office Action—U.S. Appl. No. 14/876,832.
Dec. 15, 2017—U.S. Final Office Action—U.S. Appl. No. 15/345,584.
Dec. 14, 2017—U.S. Notice of Allowance—U.S. Appl. No. 15/189,197.
Dec. 4, 2017 (CN) First Office Action—App. 201380076871.5.
Dec. 21, 2017—U.S. Notice of Allowance—U.S. Appl. No. 15/347,247.
Jan. 12, 2009—"Safeguarding removable-media devices," Sever.
Aug. 25, 2011—"A mobile and portable trusted computing platform," Nepal et al.
Sep. 2003—"Securing wireless access to mobile applications," Phifer.
2009—"Policy-Based Security Configuration Management Application to Intrusion Dection and Prevention," Alsubhi, Khalid et al., pp. 1-6.
Mar./Apr. 2002—"Simplifying Network Administration Using Policy-Based Management," Verma, Dinesh C. et al.
2004—"Policy Transformation Techniques in Policy-based Systems Management," Beigi, Mandis S., et al., pp. 1-10.
2006—"Middleware Support for Auditing Service Process Flows," Hacigumus, Hakan, pp. 24-29.
Oct. 2005—"Policy-Based Management of Networked Computing Systems," Agrawal, Dakshi et al., pp. 69-75.
Nov./Dec. 1999—"Conflicts in Policy-Based Distributed Systems Management," Lupu, Emil et al., pp. 852-869.
Jan. 25, 2018—(EP) Examination Report—App 13795317.0.
Jan. 31, 2018—(EP) Examination Report—App. 13780489.4.
Feb. 7, 2018—(CN) Reexamination Decision—App 2013800573261.
Feb. 5, 2018—(EP)—Examination Report—App 13795021.8.
Mar. 9, 2018—U.S. Non-final Office Action—U.S. Appl. No. 14/021,227.
Oct. 23, 2018 (EP) Extended European Search Report and Written Opinion—App. 18185793.9.
Nov. 12, 2018 (KR) Office Action—App. 10-2017-7022571.
Nov. 29, 2018 U.S. Non-final Office Action—U.S. Appl. No. 14/055,038.
Nov. 29, 2018—(EP) Summons to Attend Oral Proceedings—App. 13795317.0.
Hana K. Rubinsztejn et al., "Support for Context-Aware Collaboration," in "Serious Games," Jan. 1, 2004, Springer International Publishing, Cham, XP055522503, ISSN: 0302-9743, ISBN: 978-3-030-02761-2, vol. 3284, pp. 37-47, 2004.
Jan. 11, 2019—U.S. Final Office Action—U.S. Appl. No. 15/946,692.
Jan. 14, 2019—U.S. Notice of Allowance—U.S. Appl. No. 14/021,227.
Vejda et al. "Towards Trust Services for Language-Based Virtual Machines for Grid Computing", Graze University of Technology, (Mar. 11, 2008), pp. 48-59.
Jan. 10, 2019—(JP) Notification of Reasons for Refusal—App 2017-550935, Eng Tran.
Feb. 8, 2019—(EP) Examination Report—App 13 779 976.3.
"Citrix XenMobile Technology Overview | White Paper," Citrix White Papers Online, Jul. 31, 2012 (Jul. 31, 2012), pp. 1-14, XP055098728, retrieved from the Internet: URL http://www.insight.com/content/dam/insight/en_US/pdfs/citrix/xenmobile-tech-overview.pdf [retrieved on Jan. 27, 2014].
Barr et al, ; The VMware mobile virtualization platform: is that a hypervisor in you pocket? Published in: Newsletter ACM SIGOPS Operatng Systems Review archive; vol. 44 Issue 4, Dec. 2010; pp. 124-135; ACM Digital Library (Year: 2010).
Potega; Advanced Infrared (AIR): Intra-cabin wireless data netwok; Published in: 17th DASC. AAA/IEEE/SAE. Digital Avionics Systems Conference, proceedings (Cat, No. 98CH36267); Date of Conference: Oct. 31-Nov. 7, 1998; IEEE Xplore (Year: 1998).
Oct. 17, 2017—(EP) Examination Report—App 13771691.6-1853.
May 22, 2019 (EP) Extended European Search Report—App. 19152128.5.
Jun. 3, 2019—U.S. Notice of Allowance—U.S. Appl. No. 15/057,314.
Jun. 13, 2019—U.S. Final Office Action—U.S. Appl. No. 14/055,038.
Jul. 4, 2019 (EP) Extended European Search Report—App. 19168479.4.
Jul. 10, 2019—U.S. Notice of Allowance—U.S. Appl. No. 15/946,692.
Nov. 5, 2015—(EP) Communication Under Rules 61 and 62—App. 13773923.1.
Jan. 7, 2019—(EP) Notice of Allowance—App. 13773923.1.
Aug. 1, 2019—(EP) Extended European Search Report—App. 19172024.2.

* cited by examiner

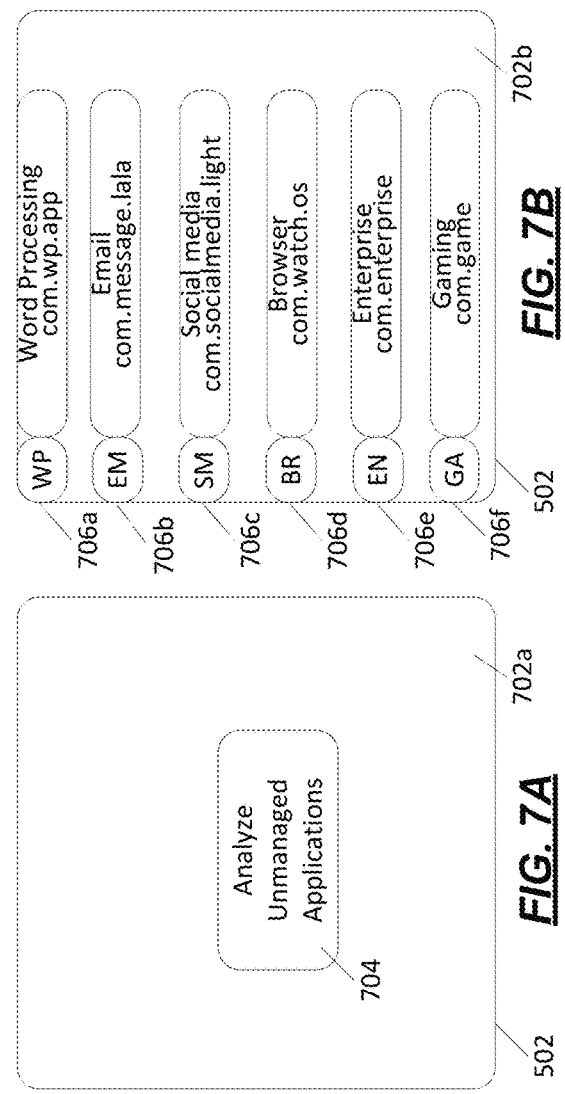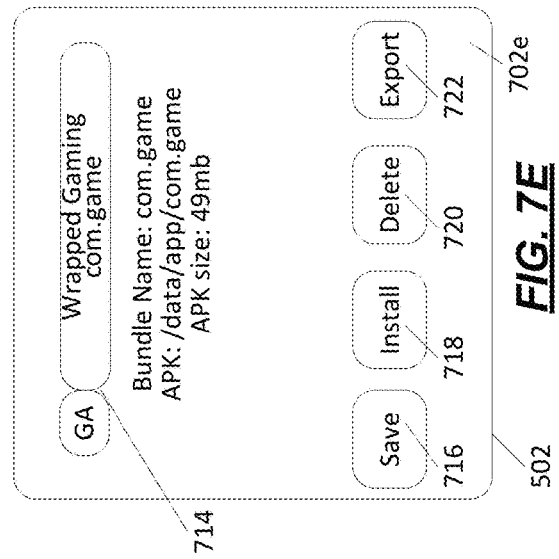

WRAPPING UNMANAGED APPLICATIONS ON A MOBILE DEVICE

CROSS-REFERENCE TO RELATED APPLICATIONS

This application is a continuation of U.S. patent application Ser. No. 14/752,132, filed Jun. 26, 2015, entitled "WRAPPING UNMANAGED APPLICATIONS ON A MOBILE DEVICE," which is a continuation-in-part of U.S. patent application Ser. No. 14/055,038, filed Oct. 16, 2013, which claims priority benefit of U.S. Provisional Patent Application No. 61/714,469, filed Oct. 16, 2012, and U.S. Provisional Patent Application No. 61/825,384, filed May 20, 2013. Application Ser. No. 14/752,132 is also a continuation-in-part of U.S. patent application Ser. No. 14/055,078, filed Oct. 16, 2013, which claims priority benefit of U.S. Provisional Patent Application 61/714,469, filed Oct. 16, 2012, and 61/825,384, filed May 20, 2013. Each of these applications is incorporated herein by reference in its entirety.

FIELD

Aspects of the disclosure generally relate to computing hardware and computer software. In particular, one or more aspects of the disclosure relate to generating managed applications from unmanaged applications on a mobile device.

BACKGROUND

Mobile devices are becoming increasingly popular. More and more people are using mobile devices in personal and business settings for a variety of purposes. These people may wish to create managed applications on their mobile devices instead of obtaining a managed application via their corporation's servers and/or via an application store. Thus, there is a need for people to be able to generate managed applications on a user device from unmanaged applications stored on that user device.

SUMMARY

As a general introduction to the subject matter described in more detail below, aspects described herein are directed to processing and modifying an unmanaged application to generate a managed application on a mobile device. Aspects described herein are also directed to installing or saving the generated managed application on that single mobile device.

One or more aspects of the disclosure provide for a method that may include storing, by a mobile device in a memory of the mobile device, one or more unmanaged applications each comprising a corresponding application bundle; retrieving, by the mobile device from the memory, information associated with the one or more unmanaged applications; and displaying, by the mobile device via a user interface associated with the mobile device, a selectable object for each unmanaged application, each selectable object comprising the retrieved information associated with the corresponding unmanaged application. The method may include receiving, by the mobile device via the user interface, a selection of a first selectable object associated with a first unmanaged application of the one or more unmanaged application; retrieving, by the mobile device from the memory, the application bundle corresponding to the first unmanaged application; and decoding, by the mobile device, the retrieved application bundle corresponding to the first unmanaged application. The method may include modifying, by the mobile device, the decoded application bundle corresponding to the first unmanaged application by adding a set of one or more policy-based control instructions; compiling, by the mobile device, the modified application bundle to generate a first managed application, the first managed application being configured to operate in accordance with the set of one or more policy-based control instructions; and providing, by the mobile device, the first managed application.

One or more aspects of the disclosure provide for a system that includes at least one processor; and at least one memory storing instructions that, when executed by the at least one processor, cause the system to perform one or more steps. The steps the system may perform may include storing, by a mobile device in a memory of the mobile device, one or more unmanaged applications each comprising a corresponding application bundle; retrieving, by the mobile device from the memory, information associated with the one or more unmanaged applications; and displaying, by the mobile device via a user interface associated with the mobile device, a selectable object for each unmanaged application, each selectable object comprising the retrieved information associated with the corresponding unmanaged application. The steps may include receiving, by the mobile device via the user interface, a selection of a first selectable object associated with a first unmanaged application of the one or more unmanaged application; retrieving, by the mobile device from the memory, the application bundle corresponding to the first unmanaged application; and decoding, by the mobile device, the retrieved application bundle corresponding to the first unmanaged application. The steps may include modifying, by the mobile device, the decoded application bundle corresponding to the first unmanaged application by adding a set of one or more policy-based control instructions; compiling, by the mobile device, the modified application bundle to generate a first managed application, the first managed application being configured to operate in accordance with the set of one or more policy-based control instructions; and providing, by the mobile device, the first managed application.

One or more aspects of the disclosure provide for one or more non-transitory computer-readable storage media having instructions stored thereon, that when executed by one or more processors, may cause the one or more processors to perform steps. The steps that the one or more processors perform may include storing, by a mobile device in a memory of the mobile device, one or more unmanaged applications each comprising a corresponding application bundle; retrieving, by the mobile device from the memory, information associated with the one or more unmanaged applications; and displaying, by the mobile device via a user interface associated with the mobile device, a selectable object for each unmanaged application, each selectable object comprising the retrieved information associated with the corresponding unmanaged application. The steps may include receiving, by the mobile device via the user interface, a selection of a first selectable object associated with a first unmanaged application of the one or more unmanaged application; retrieving, by the mobile device from the memory, the application bundle corresponding to the first unmanaged application; and decoding, by the mobile device, the retrieved application bundle corresponding to the first unmanaged application. The steps may include modifying, by the mobile device, the decoded application bundle corresponding to the first unmanaged application by adding a set of one or more policy-based control instructions; compiling, by the mobile device, the modified application bundle to generate a first managed application, the first managed application being configured to operate in accordance with the set of one or more policy-based control instructions; and providing, by the mobile device, the first managed application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 7A-7E depict illustrative diagrams showing example systems in accordance with one or more features described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
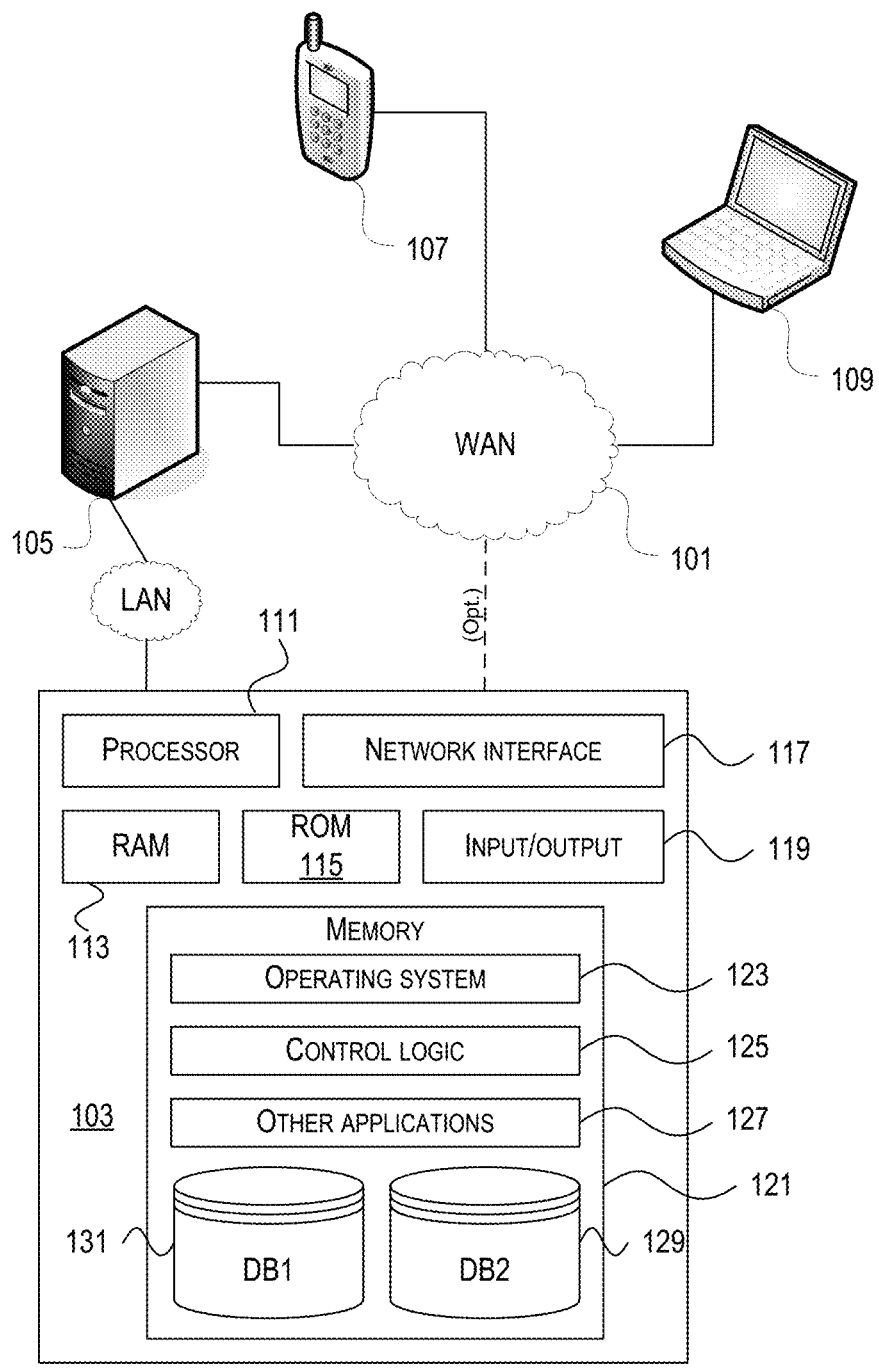
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
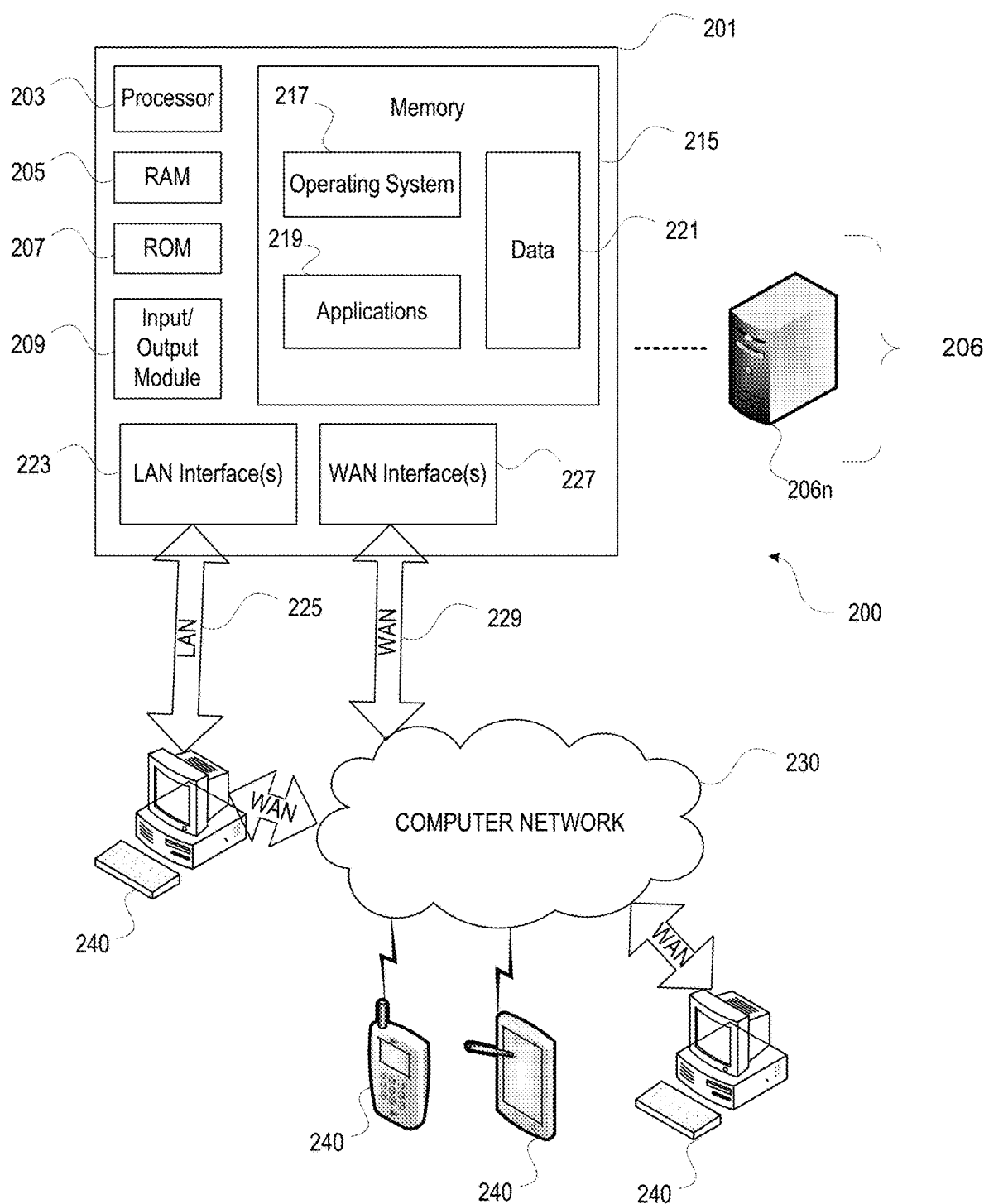
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
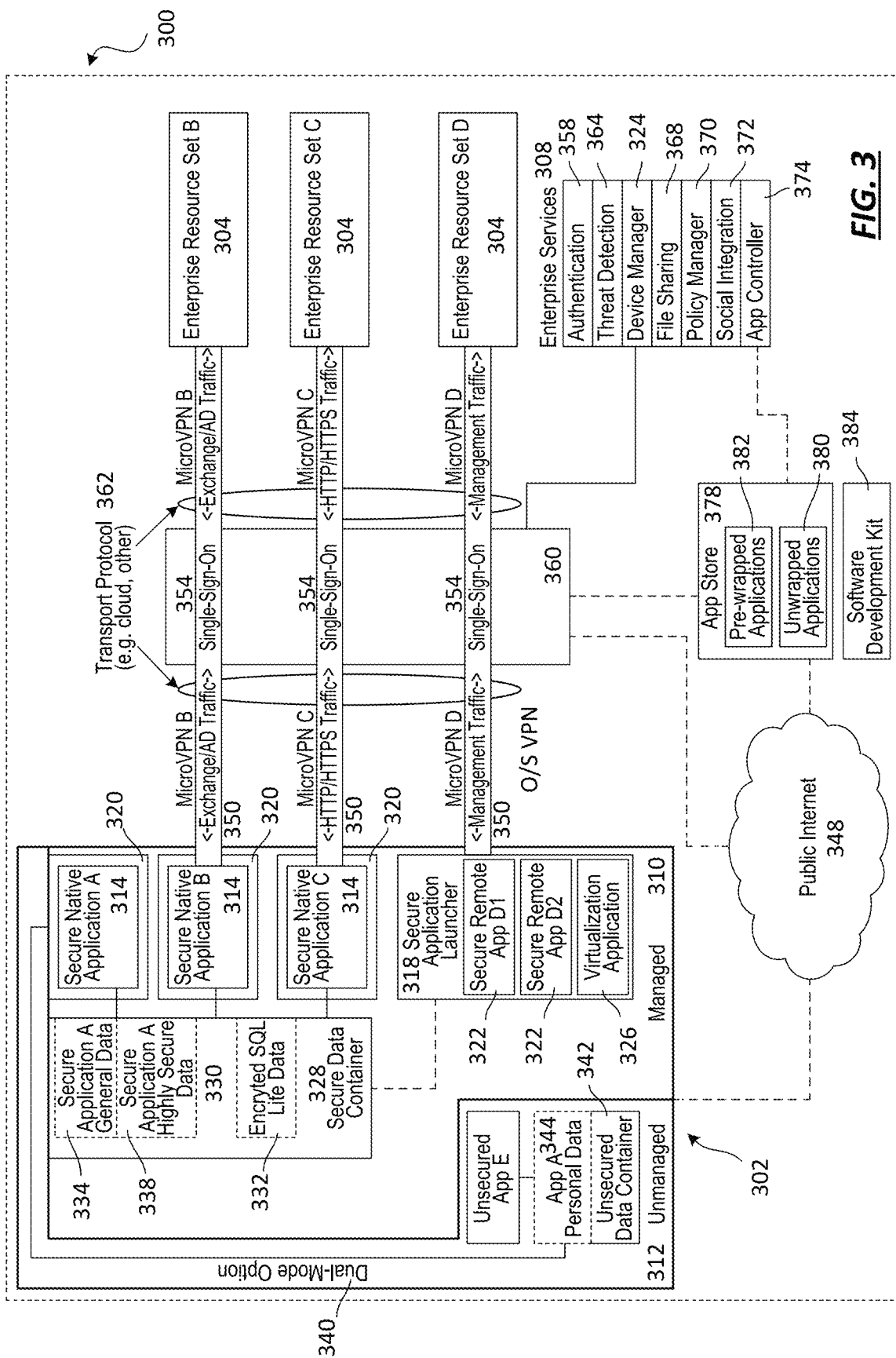
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
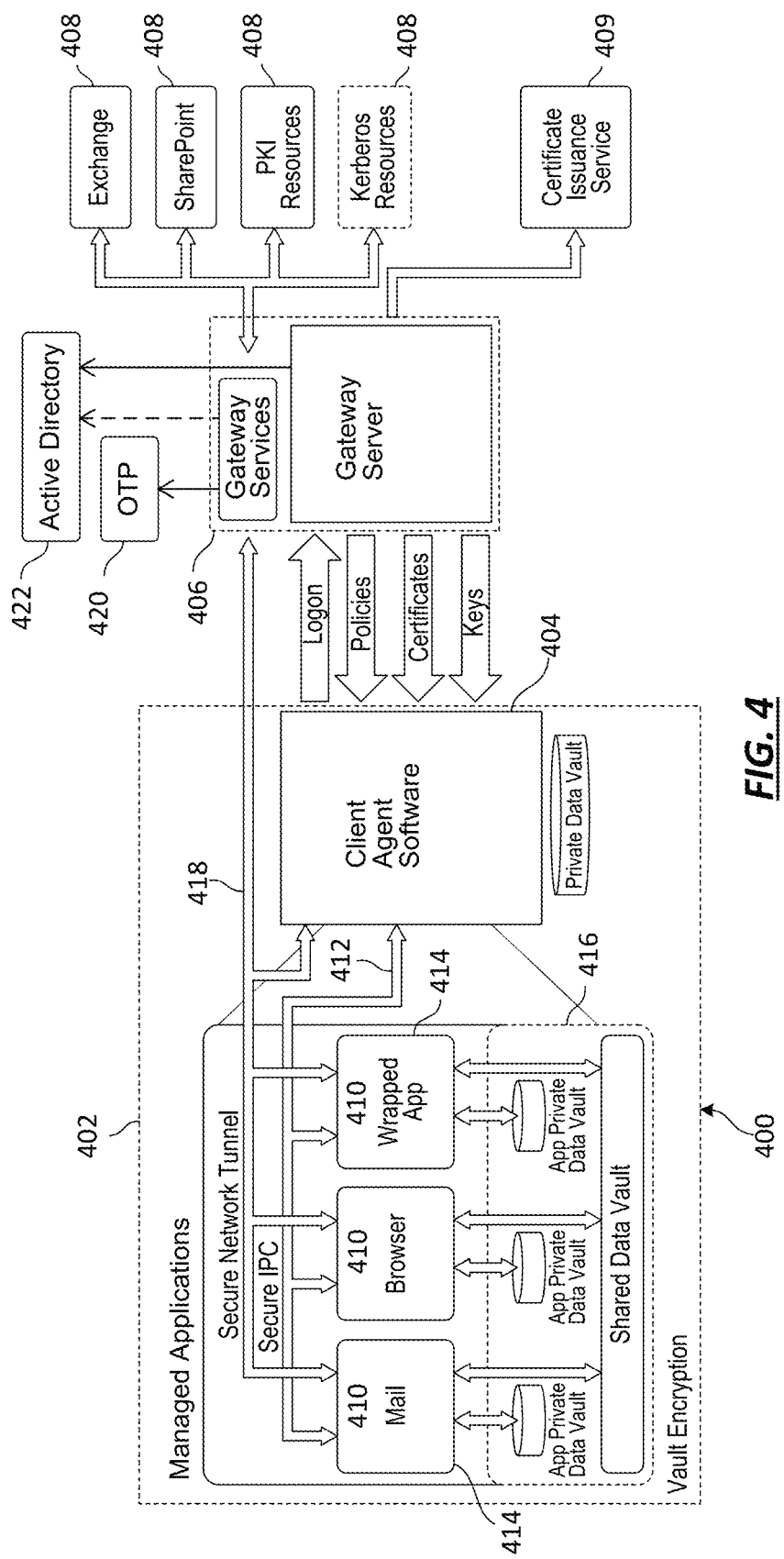
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

App Wrapping

Figure 5:
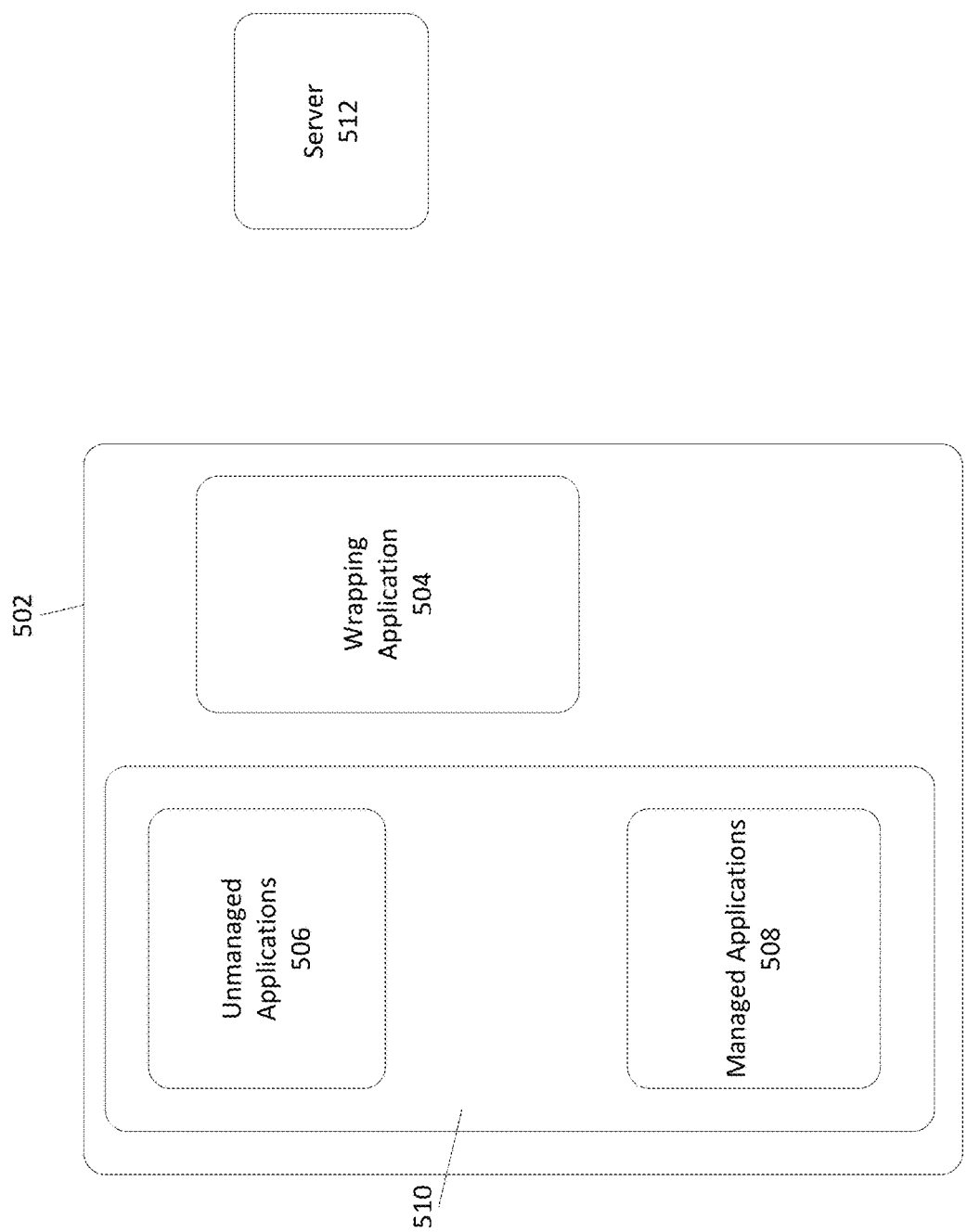
FIG. 5 depicts an illustrative diagram showing an example system in accordance with one or more features described herein.

FIG. 5 is an illustrative mobile device 502 that may implement one or more features described herein. The mobile device 502 may be similar to or may be the terminal 240, the client device 302, or the enrolled mobile device 402. For example, the mobile device 502 may be a computing device or a user device, such as a mobile phone, personal digital assistant (PDA), tablet, laptop computer, and the like.

In some instances, the mobile device 502 may include software (e.g., applications) that may be configured to run or execute on the mobile device 502. The applications stored on the mobile device 502 may include unmanaged applications 506 and managed applications 508. Unmanaged applications 506 may also be referred to herein as unwrapped applications, and managed applications 508 may be referred to herein as wrapped applications. The unmanaged applications 506 and the managed applications 508 may be stored in a memory 510 on the mobile device 502. The mobile device 502 may include a wrapping application 504 or software that, when executed, may instruct the mobile device 502 to wrap an unmanaged application 506. In other words, the mobile device 502 may use the wrapping application 504 to generate a managed application 508 from an unmanaged application 506. For example, a user may download an unmanaged gaming application 506 that the user may execute on the mobile device 502. The user may then wish to wrap the unmanaged gaming application 506 (e.g., modify the unmanaged gaming application 506 with additional or custom instructions or policies). The user may select the unmanaged gaming application 506 (e.g., via a user interface) and may execute the wrapping application 504 to wrap the selected unmanaged gaming application 506.

According to some aspects, the entire wrapping process of an unmanaged application 506 may be performed on the mobile device 502. Thus, any processing and/or modification of the unmanaged application 506 to generate a managed application 508 may occur on the mobile device 502, and any subsequent storing and/or installing of the generated managed application 508 may also occur on the mobile device 502. According to some aspects, after a managed application 508 is produced, the wrapping application 504 may allow a user to offload, from the mobile device 502, the newly created managed application 508 to another device (e.g., to the server 512). According to some aspects, the wrapping application 504 may allow a user to save or delete the newly created managed application 508. In some cases, such as when a new signing certificate (e.g., different than a signing certificate used by the original unmanaged application 506) may be required for the newly created managed application 508, the original unmanaged application 506 may need to be uninstalled from the mobile device 502 before installing the newly wrapped managed application 508 on the mobile device 502. These aspects will be described below in further detail.

Figure 6:
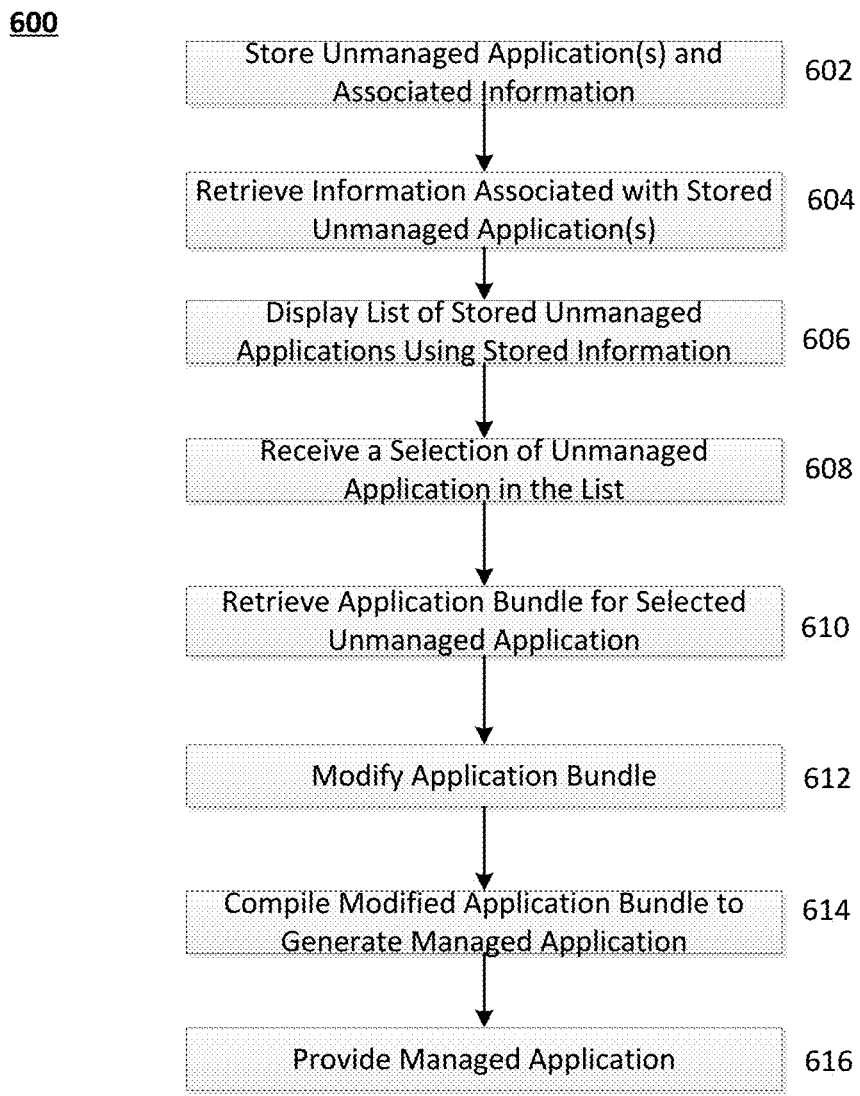
FIG. 6 depicts an illustrative flow diagram showing an example process of generating a managed application from an unmanaged application on a mobile device.

FIG. 6 is an illustrative process 600 illustrating a flow process 600 of wrapping an unmanaged application to generate a managed application in accordance with one or more features described herein. Process 600 may be performed by a computing device, such as the mobile device 502. The process 600 may include the execution and the associated operations of the wrapping application 504. In one or more embodiments, the process 600 illustrated in FIG. 6 and/or one or more steps thereof may be performed by any device or component(s) of FIGS. 1-5. In other embodiments, the process illustrated in FIG. 6 and/or one or more steps thereof may be embodied in computer-executable instructions that are stored in a computer-readable medium, such as a non-transitory computer-readable memory. The steps in this flow process 600 need not all be performed in the order specified and some steps may be omitted and/or changed in order, Process 600 may being with step 602, in which the mobile device 502 may store one or more unmanaged applications and any information associated with the unmanaged applications. In some embodiments, a user may download an unmanaged application 506 from an application distribution service or server, such as GOOGLE PLAY store or iTUNES. In some cases, a user may obtain a hard copy of an unmanaged application 506 (e.g., a CD, flash memory, etc.) and may install it on the mobile device 502. There are many other ways an unmanaged application 506 may be installed or stored on the mobile device 502. The mobile device 502 may also store any information associated with the unmanaged applications. For example, the information may be metadata that may describe attributes of an unmanaged application 506, such as size, date created, author, etc. The information may comprise XML files, text files, and other data formats. Some metadata may be determined when the mobile device 502 inspects the unmanaged application 506's application code. Some metadata may include user input information describing or relating to the unmanaged application 506, such as the application name, compatible OS versions, and the like. In some cases, the metadata may include graphics, such as icons and screenshots, for the unmanaged application 506.

The information may also include an application bundle for each of the stored unmanaged applications 506. An application bundle may include one or more executable instructions for the unmanaged application 506. Some example formats of application bundles may include zip files, .JAR files, .IPA files for APPLE mobile devices, .APK files for GOOGLE ANDROID mobile devices, MSI packages, Deb packages, .DEX files, and the like. According to some aspects, a .APK file may be a signed .JAR or .ZIP file and/or a single binary file. According to some aspects, the .JAR file may include XML files, images (.PNG, .GIF, etc.), audio files, other .JAR files, as well as application compiled code instructions that may be in the form of a .DEX file (e.g., classes.dex). According to some aspects, an application may distribute additional code instructions in the .JAR file that may then be converted to .DEX when the application first runs or executes.

The name of the application bundle (e.g., package name) may also be included in the information stored on the mobile device 502.

At step 604, the mobile device 502 may retrieve the information and metadata associated with the stored unmanaged applications 506 from the memory 510. According to some aspects, step 604 (and one or more of the other steps of the process 600) may be performed after the execution of the wrapping application 504. For example, the user may download and install an unmanaged gaming application 506 on the mobile device 502. If the user then wishes to wrap this unmanaged gaming application 506, the user may execute the wrapping application 504. An example illustration may be illustrated in FIG. 7A. FIG. 7A illustrates the mobile device 502 executing the wrapping application 504 on a user interface 702a, which may be a splash screen and the like. After the user opens or initializes the wrapping application 504, a selectable object 704 may be displayed on the user interface 702a. The object 704 may be configured to receive an input (e.g., a touch, a click, a selection) from a user. For example, the object 704 may be a selectable button 704 that may display the words "Analyze Unmanaged Applications." Thus, if a user selects the button 704, the mobile device 502 may begin retrieving the information (e.g., metadata) associated with the unmanaged applications 506 stored on the mobile device 502. According to some aspects, information associated with all or some of the stored unmanaged applications 506 may be retrieved. The wrapping application 504 may instruct the mobile device 502 to search the memory 510 to find any unmanaged applications 506 that could be wrapped. In this sense, the wrapping application 504 may be an exploratory application that finds unmanaged applications 506 and any associated information stored on the mobile device 502.

Referring back to FIG. 6, at step 606, the mobile device 502 may use the information retrieved at step 604 to generate on a display of the mobile device 502 a user interface that may list information associated with one or more stored unmanaged applications 506. An example illustration may be shown in FIG. 7B. As shown in FIG. 7B, the mobile device 502 may display a user interface 702b which may display a list of one or more selectable objects 706a-706f, each of which may correspond to an unmanaged application stored on the mobile device 502. For example, object 706a may correspond to an unmanaged word processing application, object 706b may correspond to an unmanaged email application, object 706c may correspond to an unmanaged social media application, object 706d may correspond to an unmanaged browser application, object 706e may correspond to an unmanaged enterprise application (e.g., an application created by the user's corporation, etc.), and object 706f may correspond to an unmanaged gaming application. Each object 706a-706f may include some of the information retrieved at step 604. For example, each object may comprise an icon or graphic that may be associated with a corresponding unmanaged application 506. Each object may also comprise metadata information, such as the name of the unmanaged application 506, the name of the unmanaged application's application bundle (e.g., com.wp.app for the word processing application), size of the application, location, and the like.

Referring back to FIG. 6, at step 608, the mobile device 502 may receive a selection of one of the listed unmanaged application objects (e.g., objects 706a-706f in FIG. 7), where the selection may indicate that the user may wish to wrap the selected unmanaged application 506. Thus, the user may browse through this list of unmanaged applications 506 to find one the user wishes to wrap. The user may then select (e.g., by touch input, click input, speech input, etc.) via the user interface 702b a desired unmanaged application 506 to wrap. After the user selects an unmanaged application 506 to wrap, the mobile device 502 may generate and display a user interface that may display information associated with the selected unmanaged application 506. An example illustration may be shown in FIG. 7C. As shown in FIG. 7C, the user interface 702c may display an item 708, which may include information associated with the selected unmanaged application (e.g., an icon, size, location, name of the application, name of the application bundle for the unmanaged application, and the like). The user interface 702c may also display a selectable object 710, which may be, for example, a button 710 that may display the words "Wrap It." Thus, if a user selects the button 710, the mobile device 502 may being to generate a managed application 508 that corresponds to the selected unmanaged application 506. In this example, the user has selected an unmanaged gaming application to wrap. Thus, after the user selects the button 710 on the user interface 702c, the wrapping application 504 may instruct the mobile device 502 to begin generating a managed version of the gaming application. According to some aspects, information (e.g., resources, metadata, etc.) may be changed during the wrapping process. This information may include an application icon to display, minimum or maximum operation system versions to execute the managed application 508 (e.g., minimum requirements to run the managed application 508), permissions that the application may require (e.g., add or remove device permissions that the managed application 508), and the like. According to some aspects, this information may be changed by a user that may be associated with the mobile device 502. For example, a user may be prompted to or otherwise allowed to modify these resources prior to, during, or after wrapping. According to some aspects, the wrapping application 504 may automatically modify information. For example, the wrapping application 504 may re-assign the app name to "Wrapped App X", adjust the package name to "com.app.wrapped.X", or modify the icon, such as by adding a graphic overlay.

Referring back to FIG. 6, at step 610, the mobile device 502 may locate and retrieve the application bundle for the selected unmanaged application 506 (from step 608). According to some aspects, the format of application bundle may depend on the operating system executing on the mobile device 502. For example, the application bundle for GOOGLE ANDROID mobile devices may be .APK files, which may include formats such as .JAR, .PNG, .GIF, .DEX, .XML, MSI packages, Deb packages etc. As shown in FIG. 7C, the application bundle for the selected unmanaged gaming application (as shown in the item 708) may be in the .APK format. Thus, the mobile device 502 may locate and retrieve this .APK bundle.

Figure 8:
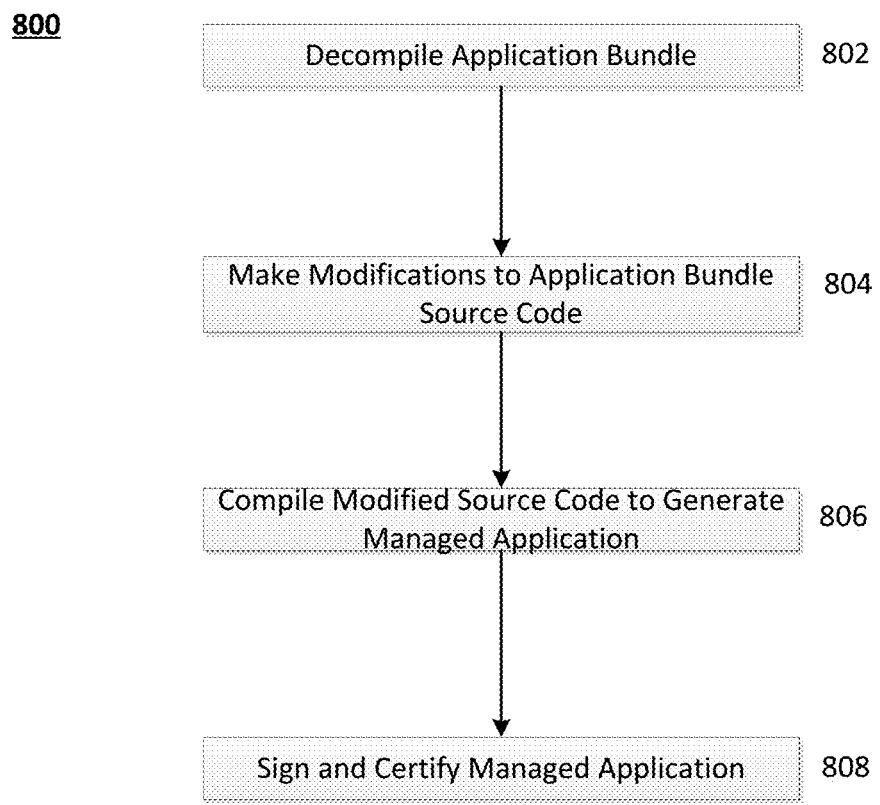
FIG. 8 depicts an illustrative flow diagram showing an example process of generating a managed application from an unmanaged application on a mobile device.

Referring back to FIG. 6, at step 612, the mobile device 502 may modify the application bundle of the selected unmanaged application 506 by adding one or more policy-based instructions, which may be configured to operate the gaming application in a managed mode. According to some aspects, the policy-based control instructions may be added to the decompiled unmanaged source code of the application's .APK file to form managed source code. Then, at step 614, this modified source code may be compiled to provide policy-based control as a newly generated managed application 508 (e.g., a managed gaming application). An example illustration of steps 612 and 614 may be shown in FIG. 7D. As shown in FIG. 7D, the mobile device may display a user interface 702d, which may display a message 712 (e.g., "Please Wait—Wrapping App"). FIG. 8 provides an example process 800 of generating a managed application from an unmanaged application (e.g., steps 612 and 614).

Referring to FIG. 8, the process 800 may describe aspects of steps 612 and 614 of FIG. 6. The process 800 may begin at step 802, where the mobile device 802 may decompile the application bundle of the unmanaged application 506. In the current example, the mobile device 802 may decompile the .APK file by unzipping the .APK file of the unmanaged gaming application 506, and then accessing and processing the source code (e.g., the instruction codes, DEX codes, etc) of the decompiled .APK file.

At step 804, the mobile device 502 may then make any modifications to the application bundle that may be required to wrap the application. For example, the mobile device 502 may insert code for various managed application features (e.g., code for monitoring and controlling system interactions) and inserting various assets into the code (e.g., security or signing certificates, secrets, resources to manage the application, etc.). The mobile device 502 may add functionality for authenticating the application via a receiver application (e.g., for application enumeration, subscription, etc.). The mobile device 502 may add support for microVPN and associated policies, as well as application containment and associated policies (e.g., managed OpenIn, secure pasteboard, location service, camera, etc.). The mobile device 502 may add data encryption support and associated policies (e.g., SQL database encryption, file encryption, etc.). The mobile device 502 may add security policies, such as the system resources and the device hardware the application may be permitted to access, the secure protocols or other network communication policies the application may be required to use, and which data encryption the application may be be required to use, etc. The mobile device 502 may add application libraries which may comprise enterprise-specific libraries or corporation-specific libraries.

According to some aspects, default policies (e.g., policy files) may be added to the wrapped application 508 during the wrapping process. These policies (as well as other policies) may be modified by a user (e.g., Disabling Network Access, blocking access to Camera or other device components, or any combination of policies that may be supported). In some embodiments, the wrapper application 504 may include a user interface display that may allow a user to visually inspect and/or adjust any polices associated with the wrapping process.

According to some aspects, an enterprise associated with the managed application 508 (e.g., an entity that manages the managed application 508) may override any policies that may have been applied at wrap time. For example, a first policy may be enabled on a managed application 508 after wrapping. The enterprise associated with that managed application 508 may be able to override the first policy (or set of policies) by providing another policy or another set of policies, which may then take precedence over the first policy (or prior set of policies). According to some aspects, the modifications may also include inserting hooks (e.g., instructions) that may call out to methods in a library file that may be added to the application during the wrapping process and may be later updated or replaced by an agent application. The agent application may override any default or current policies embedded into the application at wrap time with policies provided by the agent, which it may obtain from an enterprise store. For example, access to a network may be blocked by one or more policies applied at wrap time. If an agent application later manages the application and overrides these policies (or policy), access to the network may be re-enabled.

At step 806, the modified source code may be compiled (or re-compiled) and/or built (or re-built) by the mobile device 502 into a managed application 508 (e.g., a managed gaming application in the current example). This newly compiled modified source code may be compiled into a managed application bundle (e.g., .APK file). In addition, information associated with the managed application bundle may be generated and stored by the mobile device 502. This information may be similar to the information described above for the unmanaged application and may include the name of the managed application 508, the name of the managed application's application bundle, size of the managed application, location, and the like.

At step 808, the mobile device 502 may sign and/or certify the newly generated managed application 508 with a security or signing certificate. In some cases, the managed application 508 may be certified with a signing certificate that meets the requirements of the operating system of the mobile device 502. In some cases, the managed application 508 may be certified with a signing certificate that meets the requirements of the operating system of a device on which the application is to be deployed (e.g., such as when the mobile device 502 transmits the managed application 508 to another device, such as to the server 512). In some cases, the application package may be recertified with an original certificate that may have been used by the selected unmanaged application 506. In such cases, where the newly generated managed application 508 is certified with the original certificate of the corresponding unmanaged application 506, the mobile device 502 may be able to update or replace the unmanaged application 506 with the newly generated managed application 508 without uninstalling the unmanaged application 506. In these cases, any data associated with the original unmanaged application (e.g., user preferences, friends lists, etc.) may be used with the newly generated managed application 508. In cases where the newly generated managed application 508 is certified with a signing certificate different than the un managed application 506, some of the data (e.g., user preferences) associated with the original unmanaged application 506 may have to be imported or downloaded before this data can be used with the newly generated managed application 508. In such cases, before installing the managed application 508 on the mobile device 502, the original unmanaged application 506 may need to be uninstalled from the mobile device 502. According to some aspects, if the newly wrapped managed application 508 has a different package name than the original unmanaged application 506 (e.g., if a user changes the name such as discussed herein), then the operating system of the mobile device 502 may allow both the original unmanaged application 506 and the new managed application 508 to concurrently operate or simultaneously be installed on the mobile device 502. The process 800 may end after any step.

Referring back to FIG. 6, at step 616, after the managed application 508 is generated, the mobile device 502 may then provide the managed application 508 in any of a number of ways. For example, the mobile device 502 may save the managed application 508 to the memory 510, may delete the managed application 508, may install the managed application 508 on the mobile device 502, or may export or offload the managed application 508 (e.g., to another device, such as the sever 512). An example illustration may be shown in FIG. 7E. As shown in FIG. 7E, the mobile device 502 may generate a user interface 702e that may include an item 714, which may include information associated with the generated managed application (e.g., an icon, size, location, name of the application, name of the application bundle for the unmanaged application, and the like). The user interface 702e may also display one or more selectable objects (e.g., objects 716, 718, 720, and 722), which may be, for example, buttons that may display words. For example, button 716 may include the word "Save", button 718 may include the word "Install", button 720 may include the word "Delete", and button 722 may include the word "Export". Thus, if a user selects the button 716, the mobile device 502 may save the managed application 508 to the memory 510. If a user selects the button 718, the mobile device 502 may install the managed application 508, which may include uninstalling the corresponding unmanaged application 506 (as discussed above). If a user selects the button 720, the mobile device 502 may delete the managed application 508. If a user selects the button 722, the mobile device 502 may proceed to transmit the managed application 508 to another device, such as the server 512. The process 600 may end after any step.

According to some aspects, the managed application 508 may be re-packed into a new application after wrapping. In such cases, the managed application 508 may be labeled with a new application name (e.g., "My new app") or may have a new package name (e.g., "my.new.package.name"), which may allow the managed application 508 to be installed on the mobile device 502 at the same time as the original corresponding unmanaged application 506 (e.g., without uninstalling the original corresponding unmanaged application 506). According to some aspects, metadata that may be changed during the wrapping process may include an application icon to display, minimum or maximum operation system versions to execute the managed application 508 (e.g., minimum requirements to run the managed application 508), permissions that the application may require (e.g., add or remove device permissions that the managed application 508), and the like.

As illustrated in the discussion above, various aspects described herein may be embodied in various forms. For instance, various aspects may be embodied in a method, in a computing device, in computer-executable instructions stored in a computer-readable medium, and/or in an apparatus.

In other examples, various aspects may be embodied in a computing device that includes at least one processor and memory storing computer-readable instructions that, when executed by the at least one processor, cause the computing device to perform any and/or all of the descriptions, steps, processes, and/or methods discussed herein. In still other examples, various aspects of the disclosure may be embodied in one or more computer-readable media (which may, e.g., include a non-transitory computer-readable memory) storing instructions that, when executed by at least one processor, cause the at least one processor to perform any and/or all of the descriptions, steps, processes, and/or methods discussed herein. In yet other examples, various aspects of the disclosure may be embodied in an apparatus comprising one or more means for performing any and/or all of the descriptions, steps, processes, and/or methods discussed herein.

What is claimed is:

1. A method comprising:
   storing, in a memory, one or more unmanaged applications that are associated with one or more application bundles;
   determining, from among the one or more unmanaged applications, one or more applications capable of being wrapped;
   causing display of a user interface comprising one or more selectable objects, wherein each of the one or more selectable objects indicates a first identifier of the one or more applications capable of being wrapped and a second identifier of one or more application bundles associated with the one or more applications capable of being wrapped;
   receiving, via the user interface, a selection of a first selectable object from the one or more selectable objects, wherein the first selectable object indicates, via the first identifier of the first selectable object, an unmanaged application of the one or more applications capable of being wrapped and, via the second identifier of the first selectable object, an application bundle associated with the unmanaged application;

decoding the application bundle associated with the unmanaged application to generate a decoded application bundle associated with the unmanaged application;

modifying the decoded application bundle associated with the unmanaged application to generate a modified application bundle;

compiling the modified application bundle to generate a managed application, wherein the managed application is configured to operate in accordance with a set of one or more policy-based control instructions; and providing the managed application for installation on a mobile device.

2. The method of claim 1, wherein the determining the one or more applications capable of being wrapped is performed based on a search by a wrapping application.

3. The method of claim 2, comprising:
receiving, via the wrapping application, a request to find the one or more applications capable of being wrapped from among the one or more unmanaged applications.

4. The method of claim 1, comprising:
receiving metadata associated with the one or more applications capable of being wrapped wherein the metadata comprise the first identifier and the second identifier.

5. The method of claim 1, comprising:
modifying the decoded application bundle associated with the unmanaged application to comprise one or more policies according to the set of one or more policy-based control instructions.

6. The method of claim 1, comprising:
modifying the decoded application bundle associated with the unmanaged application to include a library file and a hook configured to call instructions in the library file.

7. A system comprising:
one or more processors; and
memory storing computer-readable instructions that, when executed by the one or more processors, cause the system to:
store, in a memory, one or more unmanaged applications that are associated with one or more application bundles;
determine, from among the one or more unmanaged applications, one or more applications capable of being wrapped;
cause display of a user interface comprising one or more selectable objects, wherein each of the one or more selectable objects indicates a first identifier of the one or more applications capable of being wrapped and a second identifier of one or more application bundles associated with the one or more applications capable of being wrapped;
receive, via the user interface, a selection of a first selectable object from the one or more selectable objects, wherein the first selectable object indicates, via the first identifier of the first selectable object, an unmanaged application of the one or more applications capable of being wrapped and, via the second identifier of the first selectable object, an application bundle associated with the unmanaged application;

decode the application bundle associated with the unmanaged application to generate a decoded application bundle associated with the unmanaged application;

modify the decoded application bundle associated with the unmanaged application to generate a modified application bundle;

compile the modified application bundle to generate a managed application, wherein the managed application is configured to operate in accordance with a set of one or more policy-based control instructions; and provide the managed application for installation on a mobile device.

8. The system of claim 7, wherein the computer-readable instructions, when executed by the one or more processors, cause the system to:
execute a wrapping application configured to search the memory to find the one or more applications capable of being wrapped from among the one or more unmanaged applications.

9. The system of claim 8, wherein the computer-readable instructions, when executed by the one or more processors, cause the system to:
receive, via the wrapping application, a request to find the one or more applications capable of being wrapped from among the one or more unmanaged applications; and
receive the selection of the first selectable object via a user interface associated with the wrapping application.

10. The system of claim 7, wherein the computer-readable instructions, when executed by the one or more processors, cause the system to:
receive metadata associated with the one or more applications capable of being wrapped wherein the metadata comprise the first identifier and the second identifier.

11. The system of claim 7, wherein the computer-readable instructions, when executed by the one or more processors, cause the system to:
modify the decoded application bundle associated with the unmanaged application to comprise one or more policies according to the set of one or more policy-based control instructions; and
receive user input adjusting which of the set of one or more policy-based control instructions to include in the one or more policies.

12. The system of claim 7, wherein the computer-readable instructions, when executed by the one or more processors, cause the system to:
modify the decoded application bundle associated with the unmanaged application to include a library file and a hook configured to call instructions in the library file.

13. One or more non-transitory computer-readable media storing computer-readable instructions that, when executed by one or more processors, cause a system to:
store, in a memory, one or more unmanaged applications that are associated with one or more application bundles;
determine, from among the one or more unmanaged applications, one or more applications capable of being wrapped;
cause display of a user interface comprising one or more selectable objects, wherein each of the one or more selectable objects indicates a first identifier of the one or more applications capable of being wrapped and a second identifier of one or more application bundles associated with the one or more applications capable of being wrapped;

receive, via the user interface, a selection of a first selectable object from the one or more selectable objects, wherein the first selectable object indicates, via the first identifier of the first selectable object, an unmanaged application of the one or more applications capable of being wrapped and, via the second identifier of the first selectable object, an application bundle associated with the unmanaged application;

decode the application bundle associated with the unmanaged application to generate a decoded application bundle associated with the unmanaged application;

modify the decoded application bundle associated with the unmanaged application to generate a modified application bundle;

compile the modified application bundle to generate a managed application, wherein the managed application is configured to operate in accordance with a set of one or more policy-based control instructions; and provide the managed application for installation on a mobile device.

14. The one or more non-transitory computer-readable media of claim 13, wherein the computer-readable instructions, when executed by the one or more processors, cause the system to:

execute a wrapping application configured to search the memory to find the one or more applications capable of being wrapped from among the one or more unmanaged applications.

15. The one or more non-transitory computer-readable media of claim 14, wherein the computer-readable instructions, when executed by the one or more processors, cause the system to:

receive, via the wrapping application, a request to find the one or more applications capable of being wrapped from among the one or more unmanaged applications; and receive the selection of the first selectable object associated with the unmanaged application via a user interface associated with the wrapping application.

16. The one or more non-transitory computer-readable media of claim 13, wherein the computer-readable instructions, when executed by the one or more processors, cause the system to:

receive metadata associated with the one or more applications capable of being wrapped, wherein the metadata comprise the first identifier and the second identifier.

17. The one or more non-transitory computer-readable media of claim 13, wherein the computer-readable instructions, when executed by the one or more processors, cause the system to:

modify the decoded application bundle associated with the unmanaged application to comprise one or more policies according to the set of one or more policy-based control instructions; and receive user input adjusting which of the set of one or more policy-based control instructions to include in the one or more policies.

18. The one or more non-transitory computer-readable media of claim 13, wherein the computer-readable instructions, when executed by the one or more processors, cause the system to:

modify the decoded application bundle associated with the unmanaged application to include a library file and a hook configured to call instructions in the library file.

19. The method of claim 1, further comprising:

indicating that the managed application meets a requirement of an operating system of the mobile device by associating the managed application with a security certificate, wherein the security certificate comprises a second security certificate used to certify the unmanaged application.

20. The method of claim 1, wherein the steps of claim 1 are performed by the mobile device.

* * * * *